US010235683B2

(12) United States Patent
Milton et al.

(10) Patent No.: US 10,235,683 B2
(45) Date of Patent: Mar. 19, 2019

(54) ANALYZING MOBILE-DEVICE LOCATION HISTORIES TO CHARACTERIZE CONSUMER BEHAVIOR

(71) Applicant: PlaceIQ, Inc., New York, NY (US)

(72) Inventors: Stephen Milton, Lyons, CO (US); Duncan McCall, Greenwich, CT (US)

(73) Assignee: PlaceIQ, Inc., New York, NY (US)

( * ) Notice: Subject to any disclaimer, the term of this patent is extended or adjusted under 35 U.S.C. 154(b) by 828 days.

(21) Appl. No.: 14/802,020

(22) Filed: Jul. 17, 2015

(65) Prior Publication Data
US 2016/0019465 A1 Jan. 21, 2016

Related U.S. Application Data

(60) Provisional application No. 62/026,128, filed on Jul. 18, 2014.

(51) Int. Cl.
G06N 5/04 (2006.01)
G06N 7/00 (2006.01)
(Continued)

(52) U.S. Cl.
CPC .......... G06Q 30/0201 (2013.01); G06N 5/04 (2013.01); G06N 7/005 (2013.01); H04W 4/021 (2013.01); H04W 4/029 (2018.02)

(58) Field of Classification Search
None
See application file for complete search history.

(56) References Cited

U.S. PATENT DOCUMENTS 7,925,995 B2 * 4/2011 Krumm ............... G06F 17/3087
715/855
8,489,596 B1 7/2013 Milton et al.
(Continued)

OTHER PUBLICATIONS

Bao, J. et al. (Nov. 2012). Location-based and preference-aware recommendation using sparse geo-social networking data. In Proceedings of the 20th international conference on advances in geographic information systems (pp. 199-208). ACM. DOI: 10.1145/2424321.2424348 (Year: 2012).*
(Continued)

Primary Examiner — Christian Chace
Assistant Examiner — Benjamin J Buss
(74) Attorney, Agent, or Firm — Pillsbury Winthrop Shaw Pittman LLP

(57) ABSTRACT

Provided is a process of inferring a user's reason for movement between geolocations sensed by a mobile device of the user, the process including: obtaining a history of time-stamped geolocations of a user; selecting a plurality of geographic areas based on each of the selected geographic areas including at least one of the time-stamped geolocations; obtaining a probabilistic model specifying parameters comprising: a plurality of candidate user events, each candidate user event being an underlying potential reason why the user moved between geographic locations; probabilities of the user transitioning between each pair of the candidate user events; and probabilities of obtaining a geolocation reported by the computing devices associated with the user in each of the plurality of geographic areas following occurrence of each of the candidate user events; inferring, with one or more processors, one of the candidate user events.

25 Claims, 3 Drawing Sheets

(51) Int. Cl.
*G06Q 30/02* (2012.01)
*H04W 4/021* (2018.01)
*H04W 4/029* (2018.01)

(56) References Cited

U.S. PATENT DOCUMENTS

| | | | |
|---|---|---|---|
| 2006/0167784 A1 | 7/2006 | Hoffberg | |
| 2008/0167943 A1* | 7/2008 | O'Neil | G06Q 30/02 705/7.34 |
| 2010/0004997 A1* | 1/2010 | Mehta | G06Q 30/02 705/14.66 |
| 2011/0081634 A1* | 4/2011 | Kurata | G01C 21/20 434/236 |
| 2013/0262350 A1 | 10/2013 | Garg et al. | |
| 2013/0305280 A1 | 11/2013 | Fleischman | |
| 2013/0346330 A1 | 12/2013 | Fleischman et al. | |
| 2014/0128105 A1 | 5/2014 | Su et al. | |
| 2014/0199964 A1 | 7/2014 | Ma et al. | |
| 2014/0236669 A1 | 8/2014 | Milton et al. | |
| 2014/0278749 A1* | 9/2014 | Trenkle | G06Q 30/0201 705/7.29 |
| 2014/0297268 A1 | 10/2014 | Govrin et al. | |
| 2015/0019294 A1 | 1/2015 | Milton et al. | |
| 2015/0026181 A1 | 1/2015 | Milton et al. | |
| 2015/0117191 A1 | 4/2015 | Subbotin et al. | |
| 2015/0143414 A1 | 5/2015 | Bentolila et al. | |
| 2015/0163121 A1 | 6/2015 | Mahaffey et al. | |
| 2015/0170044 A1 | 6/2015 | Jin et al. | |
| 2015/0200684 A1 | 7/2015 | Kanievskyi et al. | |

OTHER PUBLICATIONS

Bellotti, V. et al. (Apr. 2008). Activity-based serendipitous recommendations with the Magitti mobile leisure guide. In Proceedings of the sigchi conference on human factors in computing systems (pp. 1157-1166). ACM. DOI:10.1145/1357054.1357237 (Year: 2008).*

Yu. S-Z. et al. (2003). A hidden semi-Markov model with missing data and multiple observation sequences for mobility tracking. Signal Processing, 83(2), 235-250. DOI:10.1016/S0165-1684(02)00378-X (Year: 2003).*

Marinho, L.B. et al. (Oct. 2012). Improving location recommendations with temporal pattern extraction. In Proceedings of the 18th Brazilian symposium on Multimedia and the web (pp. 293-296). ACM. DOI:10.1145/2382636.2382698 (Year: 2012).*

'DBSCAN', http://en.wikipedia.org/wiki/DBSCAN, Wikipedia, Jul. 16, 2014, pp. 1 to 6.

'Hidden Markov model', http://en.wikipedia.org/wiki/Hidden_Markov_model, Wikipedia, Jul. 16, 2014, pp. 1 to 19.

'MapReduce', http://en.wikipedia.org/wiki/MapReduce, Wikipedia, Jul. 16, 2014, pp. 1 to 14.

'Viterbi algorithm', http://en.wikipedia.org/wiki/Viterbi_algorithm, Wikipedia, Jul. 16, 2014, pp. 1 to 9.

PlaceIQ Home Page, https://web.archive.org/web/20140625121527/http://www.placeiq.com/, Jun. 25, 2014, pp. 1 to 2.

PlaceIQ Home Page, https://web.archive.org/web/20130717093003/http://www.placeiq.com/, Jul. 17, 2013, pp. 1 to 2.

* cited by examiner

ANALYZING MOBILE-DEVICE LOCATION HISTORIES TO CHARACTERIZE CONSUMER BEHAVIOR

CROSS-REFERENCE TO RELATED APPLICATIONS

The present application claims the benefit of U.S. Provisional Patent Application 62/026,128, titled "Analyzing Mobile-Device Location Histories To Characterize Consumer Behavior," filed 18 Jul. 2014, the entire contents of which are hereby incorporated by reference for all purposes.

BACKGROUND

1. Field of the Invention

The present invention relates generally to data processing and, more specifically, to analyzing mobile-device location histories to characterize consumer behavior.

2. Description of the Related Art

Advertisers (or merchants or providers of services more generally, like government agencies) are often interested in understanding the journey of the consumer (or other user) that leads to a particular event, e.g., the consumer deciding to purchase a good or service, visit some place (like a brick and mortar store), or acquire some trait that leads to purchasing, like acquiring a hobby or other interest. In particular, advertisers often wish to know where the consumers go and what they do before and after they visit a place of business and either buy their product or procure their service. Such information is often valuable for targeting advertisements, merchandising, and planning.

SUMMARY OF THE INVENTION

The following is a non-exhaustive listing of some aspects of the present techniques. These and other aspects are described in the following disclosure.

In some aspects, the present techniques include a process of inferring a user's reason for movement between geolocations sensed by a mobile device of the user, the process including: obtaining a history of time-stamped geolocations of a user, the time-stamped geolocations being obtained based on data from one or more computing devices associated with the user and reported to one or more remote server systems; selecting a plurality of geographic areas based on each of the selected geographic areas including at least one of the time-stamped geolocations; associating the selected geographic areas with the time-stamp of the included geolocation to establish a time series sequence of the geographic areas; obtaining a probabilistic model specifying parameters comprising: a plurality of candidate user events, each candidate user event being an underlying potential reason why the user moved between geographic locations; probabilities of the user transitioning between each pair of the candidate user events; and probabilities of obtaining a geolocation reported by the computing devices associated with the user in each of the plurality of geographic areas following occurrence of each of the candidate user events; inferring, with one or more processors, a reason why the user transitioned between a given sequential pair of the geographic areas in the time series sequence of geographic areas based on the model, wherein the reason comprises one of the candidate user events; and storing the inferred reason in memory.

Some aspects include a tangible, machine-readable, non-transitory medium storing instructions that when executed by a data processing apparatus, cause the data processing apparatus to perform operations including those listed above.

Some aspects include a system, including: one or more processors; and memory storing instructions that when executed by the processors cause the processors to perform operations including those listed above.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
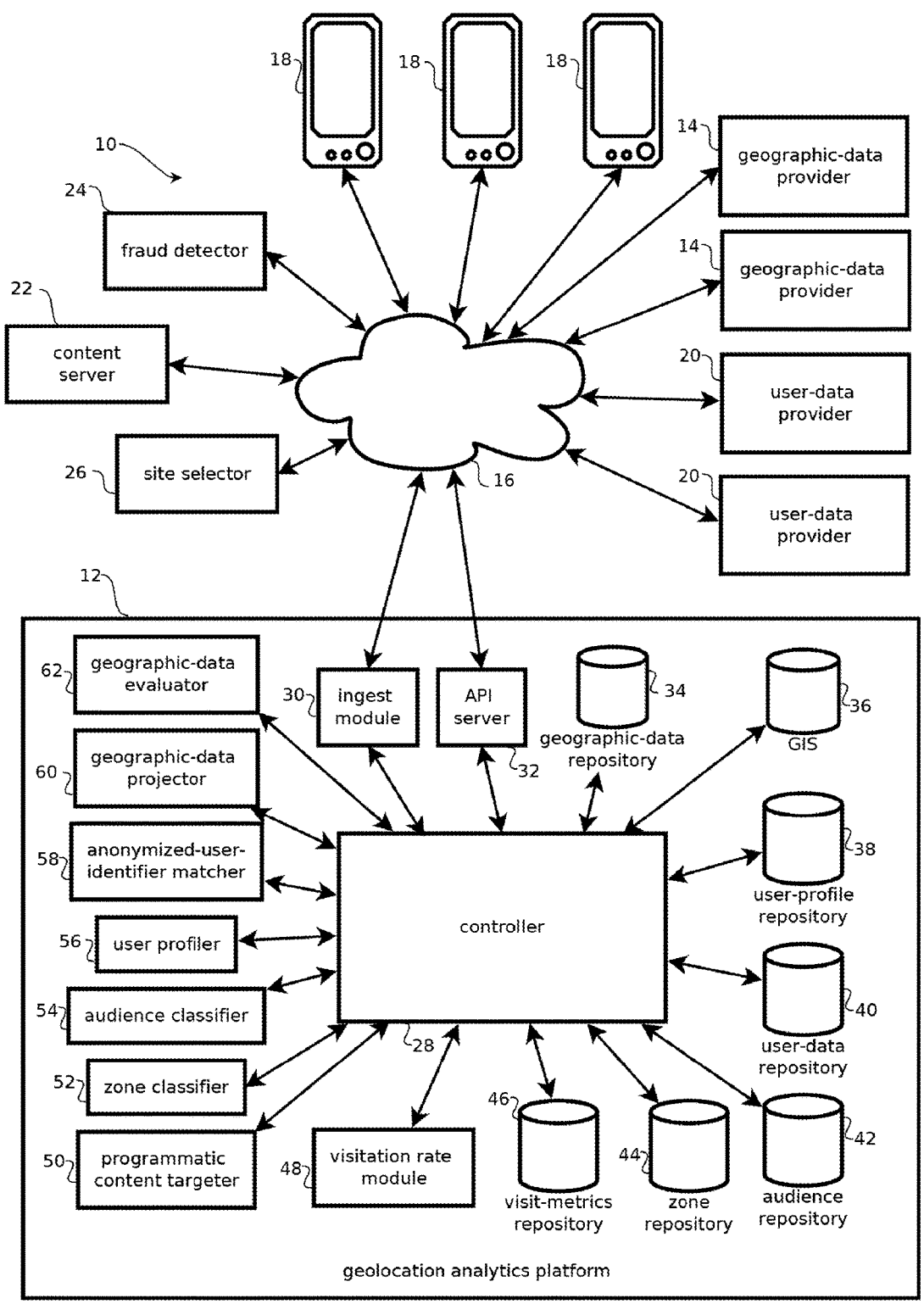
FIG. 1 shows an embodiment of a computing environment in which the present techniques may be performed.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of advertising technology and data science. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

To analyze consumers' behavior, data about consumer location histories may be acquired from consumer mobile devices, such as cell phones, tablet computers, wearable devices, and the like. The location histories may be acquired directly from the mobile devices, or the location histories may be acquired from various third parties, such as a third-party hosting Web applications rendered on the mobile devices, third parties hosting servers to which location histories are communicated by apps on the mobile devices, or third parties providing network access to the mobile devices, such as cellular service providers, for example. These location histories may be provided in a location data set including location histories from a relatively large number of users collected over some duration of time, such as over the preceding hour, day, week, month, or year. A given set of location histories acquired as a batch may include location histories for a relatively large number of users, such as tens of thousands, hundreds of thousands, or millions of users collected over some duration of time, such as over the preceding hour, day, week, month, or year.

In some cases, a batch process is used to ingest and analyze the location histories. In some cases, the location histories are based on ad requests (e.g., request for an ad to be shown in a native application or in a mobile website, the request encoding the geolocation of the mobile device, the time, and in some cases additional context, like a device identifier—such as an advertising identifier or a UDID—the website or application in which the ad will be displayed, and a user identifier). In some cases, the acquired data includes a time series of latitudes and longitudes for a given consumer, keyed on a device of the consumer, e.g., based on a device identifier.

To ingest the acquired data, some embodiments abstract the latitude/longitude of location to 100 m by 100 m tiles, such as the tiles or time-tiles of U.S. Pat. No. 8,489,596, the entire content of which is hereby incorporated by reference for all purposes, including for use of the present techniques with the disclosed user-profile datastore, mobile devices, geographic information system, and third party servers. Some embodiments may use this tile abstraction to analyze what consumers are doing at each place by applying different types of filters for tiles that provide information on what sorts of buildings or businesses are on that tile, e.g., based on attribute records for the tile (or nearby, such as at an adjacent tile or within ten tiles, depending on desired granularity) or users at the tile.

Some embodiments may be configured to join the data based on tiles in order to add contextual information from the tile, to the device IDs (or corresponding user profiles) of devices at the tile at a particular time and then do analysis from there. Some embodiments may improve upon this analysis to account for distributions in the data and expedite the analysis, as run-times and memory requirements can become prohibitive for large data sets often encountered in commercial implementations.

Often records both for devices (e.g., or a corresponding user profile) and tiles (e.g., time tiles, or tiles more generally) follows a power law. This distribution can be observed by plotting the number of devices on the y axis and the number of impressions (e.g., ad requests, leading to ad impressions on the corresponding mobile device) on the x axis (both log scaled) and noting that data often looks like a line with a negative slope, thereby indicating a power law distribution. Indeed, the Applicants have observed instances in which a relatively small proportion of devices or tiles have hundreds of thousands, or millions of ad requests.

The large-data tiles and devices/users in this part of the distribution may cause issues with some types of concurrency and distributed applications used to analyze the data. For instance, some embodiments may use map-reduce to distribute the analysis among a relative large number of distributed computing devices, mapping portions of the analysis (e.g., assigned by tile or by device/user profile) to each of the different computing devices (or to different processes on the computing devices), referred to as reducers in some cases. For the outlier tiles or devices/users having large numbers of ad requests (or large location histories), the reducers (e.g., the distributed computers or processes thereon) computing those tiles can take orders of magnitude longer to finish than those to which more typical tiles or devices were mapped for analysis.

As an example of such a data-intensive set of tiles, it is expected that the number of ad requests per month, or even per day in many 100 m by 100 m square in Times Square New York, where over 300,000 people pass through daily, will cause reducers that would take orders of magnitude longer to finish than other reducers. Notably, these data-intensive tiles are an example of where the data is legitimate and causes issues with run time. In another example, there are also large-data cases of imprecisely geolocated tiles, such as tiles located in zip code centroids that hundreds of thousands of ad requests come from daily, because a third party data provider downgrades location information to the centroid of a zip code, or never obtains more precise geolocation. In this example, the data is much less meaningful, but again, can cause a subset of reducers to take a long time to finish.

This large-data tile/device run-time/memory-space issue is consistent with, and in some cases exacerbated by, scaling in reference to the complexity of the algorithm run to analyze the data. Most of these issues can be accommodated in embodiments in which the analysis runs in linear time, but for embodiments using $O(n^2)$ or $O(n^3)$ (e.g., in terms of memory or time complexity, or both) algorithms, then data that increases in size to the degree implied by the power law distributions observed can start imposing substantial cost in terms of memory and can make running it in mapreduce (or other techniques to exploit concurrent operations to expedite analysis) an issue.

To address this issue with large-data tiles/devices and analyses that scale poorly with data set size, when mapping a portion of the analysis for a tile/device to a reducer, some embodiments may pass contextual information needed for each tile/device implicated by the portion of the analysis mapped to that reducer as a pre-computed table. In some cases, the pre-computed table is computed by embodiments before beginning the analysis or created and updated during the analysis. In some cases, the pre-computed table may be passed through a distributed cache to the reducer. Embodiments may then iterate over each device in the time series, doing a lookup into the pre-computed table for the tile associated with the location (e.g., abstracting the lat/long to the tile) to add (e.g., associate with) the statistics from the tile (such as time-tile attributes scores of the tile) to the time series or other set of data for analysis mapped to a given reducer. Or some embodiments may then iterate over each tile, doing a lookup into user profiles associated with the tile at a particular time to add (e.g., associate with) the statistics from the user profile (such as attributes scores of the user) to the time series or other set of data for analysis mapped to a given reducer.

As a result, in some use cases, embodiments may generate an augmented time series keyed on device (or tile) that contains the location (e.g., by tile, or still in lat/long) for each device and contextual information and statistics from the tile it was on. Thus, some embodiments may augment time series from large data sets of users devices, while using concurrent operations to augment the data (e.g., with map reduce), and while using pre-computed tables to expedite portions of the concurrent operation dealing with large-data tiles/devices.

This augmented time series may be used by some embodiments to do analysis such as applying a residential or commercial filter (to extract a subset of the time series in which users were in residential or commercial locations), or finding unique IDs per tile. The filtered time-series may be correlated with exposure to ads, purchasing behavior, or the like to target future advertisements or adjust ad campaigns.

While these approaches can be powerful, some embodiments may use still more sophisticated methods in order to understand this data and the journey of the consumer. Some embodiments may use data clustering algorithms, such as density-based spatial clustering of applications with noise (DBSCAN); dynamic Bayesian networks, such as Hidden Markov Models (HMMs); and dynamic programming algorithms, such as the Viterbi algorithm, as explained below.

One of the things to notice about the received time series (e.g., prior to the above-described augmentation process) is that the information obtained is, in some cases, just the data points of time-stamped geolocations in association with a device ID. In order to extract understanding and meaning from this, embodiments may infer what is going on behind that data, what is the hidden sequence of events that is causing the data observed. The previously mentioned tile filter is one way of doing this, but often advertisers want more than just a subset of the time-series having or not having certain attributes (e.g., just excluding residential portions). To address this problem, some embodiments use the Hidden Markov Model (HMM). In some user cases, an HMM is a way to take the observed time series, make some assumptions about the likelihood of consumers moving from one type of place directly to another type of place, and then use this to extract the "hidden" time series of events, e.g., the user events described below, which caused our observed sequence. An efficient algorithm for doing this, which is commonly used in the signal processing world (e.g., in non-analogous areas like processing CDMA encoding for cellular communications), is the Viterbi algorithm.

In order to make use of HMMs, some embodiments abstract the received data (e.g., the raw time series) into states, which have transitions between them. To understand significant places that a particular device frequents, some embodiments may deviate from the above-mentioned tile abstraction, which is not necessarily the correct abstraction for this model in some use cases. For instance, there could be a large number of tiles around a significant point to a consumer for which data was obtained. Rather, some embodiments may treat that entire cluster of points as one state and determine when the device transitions from this state to another, from one cluster of ad requests to another cluster of ad requests.

This clustering may be done through an algorithm executed by some embodiments called DBSCAN, which in some applications, generally starts at one point and looks for other points nearby (within a pre defined tolerance, which can be tuned) and then decides to call ones which are close enough part of the cluster. It may continue this process on the points it just included until the chain break and all the remaining points are too far away to be considered part of the cluster. This allows some embodiments to solve the problem of having ad requests over multiple tiles because those embodiments can cluster the points together and call that a single state.

Once embodiments have done this clustering, an augmented time series may be generated as a result. In contrast to the received data, rather than transitioning from one lat/long to another at each time step, the augmented time series may transit from one state to another at each time step in time, thereby generating data suitable for embodiments to apply a HMM.

Embodiments may use the HMM representation to find the best (or a suitable, e.g., within 5% of a best or optimal score) fit for the sequence of events that would explain these observed transitions. This is where embodiments run the Viterbi algorithm and after getting the optimal (or a suitable) fit of sequence of events. Using underlying assumptions about how people transition from one type of place, or state, to another, embodiments can then assign a certain significance to each of these states (e.g., scoring the states, or scoring attributes of the sates) and use that information to better understand what the device is doing at each of these locations before and after they visit someplace of interest. The significance of the states may be used to target advertisements or procure goods or services based on predicted consumer behavior.

In some embodiments, the above techniques may operate on the system of FIG. 1, which illustrates a computing environment 10 having an example geolocation analytics platform 12. Embodiments of the geolocation analytics platform 12 may be implemented with one or more of the computing devices described below with reference to FIG. 3, e.g., by processors executing instructions stored in the below-described memory for providing the functionality described herein. FIG. 1 shows a functional block diagram of an example of the geolocation analytics platform 12. While the functionality is shown organized in discrete functional blocks for purposes of explaining the software and hardware by which the geolocation analytics platform 12 may be implemented in some embodiments, is important to note that such hardware and software may be intermingled, conjoined, subdivided, replicated, or otherwise differently arranged relative to the illustrated functional blocks. Due to the size of some geographic data sets (which may be as large as 100 billion content requests or geolocations, or larger, in some use cases), some embodiments may include a plurality of instances of the geolocation analytics platform 12 operating concurrently to evaluate data in parallel and some embodiments may include multiple instances of computing devices instantiating multiple instances of some or all of the components of the geolocation analytics platform 12, depending on cost and time constraints.

The geolocation analytics platform 12 may be understood in view of the exemplary computing environment 10 in which it operates. As shown in FIG. 1, the computing environment 10 further includes a plurality of geographic-data providers 14, the Internet 16, a plurality of mobile user devices 18, a plurality of user-data providers 20, a content server 22, a fraud detector 24, and a site selector 26. While a relatively small number of the above-described components are illustrated, it should be understood that embodiments are consistent with, and likely to include, substantially more of each component, such as dozens of geographic-data providers 14 and user data providers 20, hundreds of fraud detectors 24, content servers 22, and site selectors 26, and millions or tens of millions of user mobile devices 18. Each of these components may communicate with the geolocation analytics platform 12 or one another via the Internet 16. Some such communications may be used to either provide data by which audiences are classified according to geolocation history and other parameters, and some embodiments may use classified audiences for various purposes, such as serving content, detecting financial fraud, selecting real-estate sites, or the like. The components of the computing environment 10 may connect to one another through the Internet 16 and, in some cases, via various other networks, such as cellular networks, local area networks, wireless area networks, personal area networks, and the like.

FIG. 1 shows three geographic-data providers 14, but again, embodiments are consistent with substantially more instances, for example, numbering in the hundreds of thousands. The geographic-data providers 14 are shown as network connected devices, for example, servers hosting application program interfaces (APIs) by which geographic data is requested by the geolocation analytics platform 12, or in webpages from which such data is retrieved or otherwise extracted. It should be noted, however, that in some cases the geographic data may be provided by other modes of transport. For instance, hard-disk drives, optical media, flash drives, or other memory may be shipped by physical mail and copied via a local area network to on-board memory accessible to the geolocation analytics platform 12. In some cases, the geographic data is acquired in batches, for example, periodically, such as daily, weekly, monthly, or yearly, but embodiments are consistent with continuous (e.g., real-time) data feeds as well. Thus in some cases, the geographic-data providers 14 may provide geolocation histories that are non-contemporaneous (relative to when they are acquired) and span a relatively large period of time, such as several hours, several weeks, or several months in the past.

In many cases, the entity operating the geolocation analytics platform 12 does not have control over the quality or accuracy of the provided geographic data, as that data is often provided by a third-party, for instance, sellers of geocoded advertising inventory, the data being provided in the form of ad request logs from various publishers. For instance, the geographic-data providers 14 may be mobile website publishers, retargeting services, and providers of mobile device applications, or native apps. In some cases, the geographic data comprehensively canvasses a large geographic region, for example, every zip code, county, province, or state within a country, or the geographic data may be specific to a particular area, for example, within a single province or state for data gathered by local government or local businesses. Publishers acting as the provider of the geographic data may be an entity with geocoded advertising inventory to sell, e.g., ad impressions up for auction (e.g., logged over time) that are associated with a geographic location at which the entity represents the ad will be presented. In some cases, pricing for such advertising inventory is a function, in part, of the quality and accuracy of the associated geographic locations.

In some cases, the geographic-data providers 14 may provide location history data (e.g., from the mobile devices 18), such as ad request logs indicating, for instance, a plurality of requests for advertisements from publishers (e.g., operators of various websites or mobile device native applications), each request being for an advertisements to be served at a geolocation specified in the request. The geographic location specified in a given request may be used by an advertiser to determine whether to bid on or purchase the right to supply the requested advertisement, and the amount an advertiser wishes to pay may depend on the accuracy and quality of the identified geolocation. These location history records may contain a plurality of such requests, each having a geolocation (e.g., a latitude coordinate and a longitude coordinate specifying where a requested ad will be served), a unique identifier such as a mobile device ID (e.g., a device identifier of a end user device 18 upon which the ad will be shown) and a timestamp. In some cases, the device identifier may be a Unique Device Identifier (UDID) or an advertiser or advertising specific identifier, such as an advertising ID.

In FIG. 1, three mobile user devices 18 are illustrated, but it should be understood that embodiments are consistent with (and most use cases entail) substantially more user devices, e.g., more than 100,000 or more than one million user devices. The illustrated user devices 18 may be mobile handheld user devices, such as smart phones, tablets, or the like, having a portable power supply (e.g., a battery) and a wireless connection, for example, a cellular or a wireless area network interface, or wearable user devices, like smart watches and head-mounted displays. Examples of computing devices that, in some cases, are mobile devices are described below with reference to FIG. 3. User devices 18, however, are not limited to handheld mobile devices, and may include desktop computers, laptops, vehicle in-dash computing systems, living room set-top boxes, and public kiosks having computer interfaces. In some cases, the user devices 18 number in the millions or hundreds of millions and are geographically distributed, for example, over an entire country or the planet.

Each user devices 18 may include a processor and memory storing an operating system and various special-purpose applications, such as a browser by which webpages and advertisements are presented, or special-purpose native applications, such as weather applications, games, social-networking applications, shopping applications, and the like. In some cases, the user devices 18 include a location sensor, such as a global positioning system (GPS) sensor (or GLO-NASS, Galileo, or Compass sensor) or other components by which geographic location is obtained, for instance, based on the current wireless environment of the mobile device, like SSIDs of nearby wireless base stations, or identifiers of cellular towers in range. In some cases, the geographic locations sensed by the user devices 18 may be reported to the content server 22 for selecting content based on location to be shown on the mobile devices 18, and in some cases, location histories (e.g., a sequence of timestamps and geographic location coordinates) are acquired by the geographic-data providers 20, which may include content providers. In other cases, geographic locations are inferred by, for instance, an IP address through which a given device 18 communicates via the Internet 16, which may be a less accurate measure than GPS-determined locations. Or in some cases, geographic location is determined based on a cell tower to which a device 18 is wirelessly connected. Depending on how the geographic data is acquired and subsequently processed, that data may have better or less reliable quality and accuracy.

In some use cases, the number of people in a particular geographic area at a particular time as indicated by such location histories may be used to update records in the geolocation analytics platform 12. Location histories may be acquired by batch, e.g., from application program interfaces (APIs) of third-party providers, like cellular-network operators, advertising networks, or providers of mobile applications. Batch formatted location histories are often more readily available than real-time locations, while still being adequate for characterizing longer term trends in geographic data. And some embodiments may acquire some locations in real time (e.g., within 2 seconds of a request), for instance, for selecting content (like an advertisement, review, article, or business listing) to be displayed based on the current location.

The user-data providers 20 may provide data about users that is not necessarily tied to geolocation, such as purchasing history, media viewing history, automotive records, social networking activity, and the like. In some cases, user-data providers 20 include credit card processors, banks, cable companies, or television rating services. In some embodiments, user-data providers include microblogging services, location check-in services, or various other social networks. In some cases, audience classification according to geolocation may be supplemented with such data, for instance, according to the appearance of various keywords in social network posts, linkages between users indicated by social networks, or patterns in buying or reviewing behavior. In some cases, various features may be extracted from such data and included in the analysis described below for identifying audiences.

The illustrated content server 22 is operative to receive a request for content, select content (e.g., images and text), and send the content for display or other presentation to a user. One content server 22 is shown, but embodiments are consistent with substantially more, for example, numbering in the thousands. In some cases, the content is advertisements and advertisements are selected or bid upon with a price selected based on the geographic location of a computing device upon which an advertisement will be shown, which may be indicated by one of the geographic-data providers/content servers, or such entities may also be a publisher selling the advertising inventory. Accordingly, the accuracy and quality of such geographic data may be of relevance to the parties selling or buying such advertising space. The selection or pricing of advertisements may also depend on other factors. For example, advertisers may specify a certain bid amount based on the attributes of the geographic area documented in the geolocation analytics platform 12, or the advertiser may apply various thresholds, requiring certain attributes before an advertisement served, to target advertisements appropriately.

Some embodiments include a fraud detector 24 which may include an automated process run by a financial institution that detects anomalous behavior indicative of fraud based, in part, on correlations (or lack thereof) between financial transactions and patterns identified by the geolocation analytics platform 12. For instance, in some embodiments, the fraud detector 24 may submit a query to the geolocation analytics platform 12 based on a financial transaction, such as the purchase of a particular type of automobile, and the geolocation analytics platform 12 may respond with an audience classification of the user. In some embodiments the fraud detector 24 may determine whether the user who engaged in the financial transaction is likely to be a member of the audience for such purchases based on the data provided by the geolocation analytics platform 12. For example, a user who is not a member of an audience in Austin, Tex. that is present in Austin golf courses regularly, upon purchasing a set of golf clubs, may trigger a fraud alert, when the fraud detector receives a report for the geolocation analytics platform 12 that the user is not a member of an Austin, Tex., golf-playing audience. In some cases, the fraud detector may maintain an ontology of types of financial transactions and audiences associated with those transactions. Upon receiving a record of a financial transaction, the fraud detector may query audiences corresponding to the user, the location, and the time of the transaction, and determine whether the responsive audiences match those associated with the type of financial transaction in the ontology. Fraud may be detected based on the absence of such matches.

In some embodiments, the site selector 26 may categorize geographic areas as appropriate sites for various activities, such as positioning stores, allocating government resources, or distributing content into various zones based on geolocations frequented by audiences identified by the geolocation analytics platform 12. For instance, the site selector 26 may submit a request for zones in which members of a particular audience are present during lunch time and position restaurants in those zones.

In some embodiments, the geolocation analytics platform 12 may include a controller 28 that directs the activity of and routes data between the various components of the geolocation analytics platform 12. In some cases, the functionality of the controller may be divided into various processes, such as a separate controller for ingesting data, cleaning and normalizing data, classifying audiences and zones, targeting content, and evaluating the success of such targeting in driving visitation to various geographic locations. In some embodiments, activities other than programmatic content targeting may be performed as batch processes at times scheduled by the controller 28, such as daily or hourly, non-contemporaneously with when such data is used, to facility faster responses when the pre-processed data is used.

Some embodiments may include an ingest module 30 operative to retrieve data from the geographic-data providers 14 and user-data providers 20 via various APIs of such services. In some cases, such data may be routed by the controller 28 to a geographic data evaluator 62, examples of which are described in U.S. patent application Ser. No. 14/553,422, which is incorporated by reference in its entirety. The geographic-data evaluator may evaluate the quality of geographic data by geographic data provider and detect suspect, low-quality geographic data. Data from such providers with a history of providing low-quality data may be rejected from, or down-weighted in, the analyses described below, or such data providers may be stored with corresponding scores for purposes of bidding on the opportunity to serve advertisements or other content via such providers, for instance, in response to a content request for a website hosted by such a geographic-data provider.

Some embodiments may include an application program interface server 32, which may receive requests for information about audiences and geographic locations from the various entities operating devices 22, 24, and 26. In some cases, this may include requests by a third party content targeter for audiences corresponding to a current user device, at a current geolocation, requesting content at a current time (e.g., within the previous two seconds or so). In some cases, responsive data may include a list of audiences corresponding to these inputs or a list of scores for a plurality of audiences indicative of how well those inputs correspond to those audiences. In other examples, the request may include a request for an inventory of geographic areas corresponding to a specified audience, such as geographic areas or categories of places frequented by mobile device users who also frequent a given store or category of stores.

Some embodiments may include a geographic-data repository 34. The geographic-data repository 34, in some embodiments, stores geographic data from the geographic-data providers 14 and associated quality profiles of the geographic data, including measures of geographic data quality and accuracy provided by the geographic-data evaluator 62. In some embodiments, content providers, such as advertisers, or publishers, or others interested in the quality of geographic data from a given data provider 14 may query the geographic-data repository 34 for information output by the geographic-data evaluator 62.

Some embodiments may include a geographic information system 36. The geographic information system 36 may be configured to provide information about geographic locations in response to queries specifying a location or attribute of interest (or combinations thereof). In some embodiments, the geographic information system (GIS) 36 organizes information about a geographic area by quantizing (or otherwise dividing) the geographic area into area units, called tiles, that are mapped to subsets of the geographic area. In some cases, the tiles correspond to square units of area having sides that are between 10-meters and 1000-meters, for example, approximately 100-meters per side, depending upon the desired granularity with which a geographic area is to be described. Tiles are, however, not limited to square-shaped tiles, and may include other tilings, such as a hexagonal tiling, a triangular tiling, or other regular tilings (e.g., for simpler processing), semi-regular tilings, or irregular tilings (e.g., for describing higher density areas with higher resolution tiles, while conserving memory with larger tiles representing less dense areas). In some cases, such tilings may facilitate relatively fast access to data, such as in-memory data structures responsive to queries without retrieving data from a hard disk, though embodiments are not limited to systems that provide this benefit, which is not to suggest that any other feature described herein may also be omitted in some embodiments.

In some cases, polygons corresponding to businesses and other places, points corresponding to points of interest, and lines corresponding to roads, railroad tracks, and the like may also be stored in the geographic information system 36 as geographic features. In some cases, attributes of tiles overlapping such features may be mapped to these features, e.g., in proportion to the amount of area of a tile occupied by the corresponding feature and as a weighted combination of multiple tiles in which such a feature may be disposed, for instance, with such weights being proportional to the amount area of the feature in each respective tile. In some cases, the described attributes of the tiles may be mapped directly to the features, e.g., with a record for each such a feature, or subset of such a feature, like a floor of a store, or aisle of a store, with the features grouped according to the tile in which they are disposed for relatively fast searching of features by first retrieving a group of features in a single tile. To simplify the mapping, in some cases, irregular tiles may correspond to the boundaries of features.

In some cases, the attributes of a geographic area change over time. Accordingly, some embodiments divide each tile (or feature, if characterized separately, for example) according to time. For instance, some embodiments divide each tile into subsets of some duration of time, such as one week, one month, or one year, and attributes of the tile are recorded for subsets of that period of time. For example, the period of time may be one week, and each tile may be divided by portions of the week selected in view of the way users generally organize their week, accounting, for instance, for differences between work days and weekends, work hours, after work hours, mealtimes, typical sleep hours, and the like. Examples of such time divisions may include a duration for a tile corresponding to Monday morning from 6 AM to 8 AM, during which users often eat breakfast and commute to work, 8 AM till 11 AM, during which users often are at work, 11 AM till 1 PM, during which users are often eating lunch, 1 PM till 5 PM, during which users are often engaged in work, 5 PM till 6 PM, during which users are often commuting home, and the like. Similar durations may be selected for weekend days, for example 8 PM till midnight on Saturdays, during which users are often engaged in leisure activities. In some cases the divisions of time are logically connected but are disjoint, for instance, morning and evening commute times may be classified in a single category of time corresponding to commuting. Each of these durations may be profiled at each tile.

In some embodiments, the geographic information system 36 includes a plurality of tile (or feature, if separately tracked) records, each such record corresponding to a different subset of a geographic area. Each tile (or feature) record may include an identifier, an indication of geographic area corresponding to the tile (which for regularly sized tiles may be the identifier from which location can be calculated or may be a polygon with latitude and longitude vertices, for instance), and a plurality of tile-time records. Each tile-time record may correspond to one of the above-mentioned divisions of time for a given tile, and the tile-time records may characterize attributes of the tile at different points of time, such as during different times of the week. Each tile-time (or feature-time) record may also include a density score indicative of the number of people in the tile at a given time. In some embodiments, each tile-time record includes an indication of the duration of time described by the record (e.g., lunch time on Sundays, or dinnertime on Wednesdays) and a plurality of attribute records, each attribute record describing an attribute of the tile at the corresponding window of time during some cycle (e.g., weekly). Some embodiments may include seasonal variants of such time designations, e.g., a set of time categories for the Christmas season, a set for Summer, and a set for the remainder of the year, constituting a type of time-tile record called a time-tile-season record.

The attributes may be descriptions of activities in which users (e.g., of third party services that provide data to the geolocation analytics platform 12) engage that are potentially of interest to advertisers or others interested in geographic data about human activities and attributes (e.g., geodemographic data or geopsychographic data). For example, some advertisers may be interested in when and where users go to particular types of restaurants, when and where users play golf, when and where users watch sports, when and where users fish, or when and where users work in particular categories of jobs. In some embodiments, each tile-time record may include a relatively large number of attribute records, for example, more than 10, more than 100, more than 1000, or approximately 4000 attribute records, depending upon the desired specificity with which the tiles are to be described. Each attribute record may include an indicator of the attribute being characterized and an attribute score indicating the degree to which users tend to engage in activities corresponding to the attribute in the corresponding tile at the corresponding duration of time. In some cases, the attribute score (or tile-time record) is characterized by a density score indicating the number of users expected to engage in the corresponding activity in the tile at the time. In some cases, attributes may be organized in a hierarchical ontology, for instance, businesses→retail→convenience_stores, or demographic→suburbanite→young_professional.

Thus, to use some embodiments of the geographic information system 36, a query may be submitted to determine what sort of activities users engage in at a particular block in downtown New York during Friday evenings, and the geographic information system 36 may respond with the attribute records corresponding to that block at that time. Those attribute records may indicate a relatively high attribute score for high-end dining, indicating that users typically go to restaurants in this category at that time in this place, and a relatively low attribute score for playing golf, for example. Or a query may request tiles or features for which a given attribute score is exhibited. Attribute scores may be normalized, for example, a value from 0 to 10, with a value indicating the propensity of users to exhibit behavior described by that attribute. In some cases, scoring attributes according to a discrete set of normalized values may facilitate use of in-memory data structures that provide relatively fast access to information, though embodiments are not limited to systems that provide this benefit, which is not to suggest that any other feature described herein may also be omitted in some embodiments. Further, the attribute scores may be pre-calculated before such scores are used in an analysis, as some forms of analysis are relatively latency sensitive, such as content selection, which users are expected prefer to have happen within less than 500 milliseconds, while calculating attribute scores may take substantially longer.

In some cases, the user-profile repository 38 may store profiles of users of mobile devices 18 that are based on a user's geolocation history and in some cases data from user-data providers 20. In some cases, these user profiles may be created by a user profiler 56, an example of which is described in U.S. Pat. No. 8,489,596, the entire contents of which are incorporated by reference. The user profiler 56 may join the location histories of user devices corresponding to a user and tile records implicated by locations in those location histories to generate user profiles. Thus, users may be characterized according to the attributes of the places those users visit at the time the user visits those places. The generated user profiles may then be stored by the user profiler 56 in the user-profile repository 38. Further, in some embodiments, the user-profile repository 38 may store inferred user event sequence formed with the techniques described below with reference to FIG. 2, e.g., in association with the user to which the events pertain and by whom corresponding geolocations were reported. In some cases, user profiler 56 may execute the processes described below with reference to FIG. 2 to infer the sequences of user events, or individual user events.

The illustrated user-profile repository 38 includes a plurality of user-profile records, each record corresponding to the profile of a given user or a given mobile device 18. Each user-profile record may include an identifier of the record (which may be a value otherwise uncorrelated with the identity of the user to enhance privacy), and an identifier of the source or sources of the location histories from which the profile was created such that subsequent location histories can be matched with the profile (e.g. a account associated with a special-purpose native application, a cell phone number, or some other value, which may be hashed to enhance user privacy).

Each user-profile record may also include a plurality of profile time (or profile-time-season) records indicating attributes of the user profile at different times during some cycle of time (e.g., portions of the week or month, or during other periods like those described above with reference to the geographic information system 36). In some cases, the profile-time records may correspond to the same durations of time as those of the time-tile records described above. Each profile-time record may include an indication of the duration of time being described (e.g. Thursdays at dinnertime, or Saturday midmorning) and a plurality of profile attribute records, each profile attribute record indicating the propensity of the corresponding user to engage in an activity, or exhibit a property, described by the attribute during the corresponding time of the profile-time record. The profile time records may allow tracking of when users tend to engage in a given activity (e.g., time of day, day of week, week of year). In some embodiments, the profile attribute records correspond to the same set of attribute records described above with reference to the geographic information system 36. Each profile-attribute record may include an indication of the attribute being characterized (e.g., attending a children's soccer game, having brunch at a fast-casual dining establishment, parent running errands, or shopping at a mall) and a score indicating the propensity of the user to engage in the activity at the corresponding time, such as a normalized value from 0 to 10. The attribute records may further include a sample size, indicative of the number of samples upon which the attribute score is based, for weighting new samples, and a measure of variance among these samples (e.g., a standard deviation) for identifying outliers.

As described below, the user-profile records may be used for a variety of purposes. For example, publishers operating content server 22 may submit to the geolocation analytics platform 12 a query identifying one of the user-profile records, such as a hashed value of a user account number or phone number, and the geolocation analytics platform 12 may respond with the attributes of the corresponding user at the current time. In some embodiments, to further enhance user privacy, queries may be submitted for a specific attribute to determine whether to serve content corresponding to the attribute, or a query may request a binary indication of whether the attribute score is above a threshold.

In another example, the user-profile repository 38 may be used by the user profiler 56 to augment the records in the geographic information system 36. For example, an index may be created for each attribute that identifies tiles where users having relatively strong scores (e.g. above a threshold) for the respective attribute tend to co-occur at given times. These indices may correspond to heat maps (though no visual representation need be created) indicating where, for example, users interested in golf tend to be during various times of the day, such that content-providers can select content based on this information, or related services may be positioned nearby. In some embodiments, an index may be created for each user attribute at each of the above-described divisions of time in the geographic information system 36, and these indices may be queried to provide relatively prompt responses relating to where users having a given attribute or combination of attributes tend to co-occur at various times. Precalculating the indices is expected to yield faster responses to such queries than generating responsive data at the time the query is received. For instance, using examples of these indices relating to fishing and employment in banking, an advertiser may determine that people who engage in fishing on the weekend and work in banking tend to drive relatively frequently along a particular stretch of road on Mondays during the evening commute, and that advertiser may purchase an advertisement for bass fishing boats as a source of relaxation for bankers on a billboard along that road in response.

In some cases, user profiles may be supplemented with data from the user-data providers 20. In some embodiments, a user-data repository 40 may store such data as it is acquired for further analysis. Further, in some embodiments, the quality of data from such data providers may be scored, and such scores may be associated with identifiers of the providers in the user-data repository 40. In some embodiments, this data may be down-weighted or rejected based on indicators of low-quality.

Some embodiments may include an audience repository 40 storing records by which audience membership may be determined. These records, in some cases may be created and accessed by an audience classifier 54. In some cases, audience membership is pre-calculated before a query is received, for example, for each recognize query within some parameter space, for instance, for every type of attribute record, pair of attribute records, or attribute record combined with larger geolocation area, like weekend golfers in the state of Texas. In some cases, parameters of models by which audience membership is determined may be stored in the audience repository 42, for example, learned parameters that are pre-calculated according to training sets. In some cases, an audience membership vector may be calculated based on a given geographic location, a given user identifier (e.g., a device identifier), and given time, with each component of the vector indicating membership in a corresponding audience. In some cases, membership may be binary, or some embodiments may score membership, for example from 0 to 10 depending on the probability of membership in the corresponding audience given the inputs. In some cases, each component of the audience vector may be calculated according to an audience member function that is a combination (e.g., weighted sum) of feature functions. Examples of such feature functions may include scores indicating whether a given user is currently within a tile having a particular attribute score (or collection of attribute scores) above a threshold, whether a given user has visited tiles having a particular attribute score above a threshold at particular times more than a threshold amount of times within some trailing duration, and the like. In some cases, a collection of audience vectors for each user may be stored in the respective user profile, e.g., as a sparse matrix having rows or columns indexed according to times and geolocations at which the corresponding audience vector applies. In some cases, identifying feature functions with predictive value can be relatively challenging given the relatively large, high-dimensional search space of candidate feature functions in many commercially relevant implementations.

Some embodiments may include a zone repository 44, which may include zone records populated by a zone classifier 52. Zones may be geographic areas associated with audiences. For example, some embodiments may identify geographic areas that students at a local university tend to visit, with the corresponding audience being likely students at a given university or collection of universities, or those who are regularly at such universities (e.g., more than a threshold amount of times in a trailing duration of time). In some cases, the zone repository may include zone records that list tiles or time tiles likely to be visited by members of particular audiences. In some cases, zones may be classified according to an amount of mutual information between of events corresponding to audience membership and members of those audiences visiting particular tiles. In some cases, the mutual information may be calculated in terms of a conditional entropy, and tiles having the highest mutual information (for example, greater than a threshold amount of tiles, like a threshold percentage) may be selected for consideration as members of the zone for that audience.

In some cases, the selected candidate tiles may be clustered and resulting clusters may be designated as zones. Some embodiments may execute a density-based clustering algorithm, like DBSCAN, to establish groups corresponding to the resulting clusters and exclude outliers. Some embodiments may examine each of the geolocations reflected in the records and designate a tile as a core tile if at least a threshold amount of the other tiles in the records are within a threshold geographic distance or number of tiles. Some embodiments may then iterate through each of the tiles and create a graph of reachable geolocations, where nodes on the graph are identified in response to non-core corresponding tiles being within a threshold distance of a core tile in the graph, and in response to core tiles in the graph being reachable by other core tiles in the graph, where two tiles are reachable from one another if there is a path from one tile to the other tile where every link and the path is a core tile and the tiles in the link are within a threshold distance of one another. The set of nodes in each resulting graph, in some embodiments, may be designated as a cluster, and points excluded from the graphs may be designated as outliers that do not correspond to clusters. Outliers may be excluded from zones in some cases.

Some embodiments may include a visit-metrics repository 46 having records created by a visitation rate module 48. In some cases, the records may indicate the degree to which content targeted to particular users succeeded in driving those users to visit a targeted geographic location, for example, records indicating whether an advertisement targeted to users in a particular neighborhood succeeded in driving those users to visit a particular store. In some cases, the visitation rate module 48 may include the visitation rate module of U.S. patent application Ser. No. 13/769,736, the entire contents of which are incorporated by reference. In some cases, visitation rates may be adjusted to account for undercounting of undetected people, for example, those not employing cell phones while in the targeted location or employing cell phones that are not detectable, for instance, due to lack of signal quality for a particular type of handset or carrier. In some cases, such undercounting may correlate with various attributes of the user, including the user's mobile device, and some embodiments may adjust detected visitation rates to account for such undercounting. Some embodiments may measure a marginal increase in an amount of visits to a target geographic location likely to be attributable to targeted content. For example, some embodiments may identify audience members, serve targeted content to some of the audience members (e.g., a treatment group), and compare visitation amounts (e.g., calculate a statistically significant amount of difference between) between those audience members that receive the targeted content and those that did not (e.g., a control group of the audience) to determine a marginal increase attributable to the targeted content. Feedback from such measurements may be used to tune audience classification algorithms or select among audiences, e.g., dynamically unselecting audiences for which a response fails to satisfy a visitation threshold. That said, not all embodiments necessarily provide these benefits, which is not to suggest that any other feature may not also be omitted in some cases.

Some embodiments may include a programmatic content targeter 50. In some cases, this module may automatically determine whether to provide content and which content to provide, in some cases at the time of the content request, based on classification of audiences or zones. In some embodiments, the programmatic content targeter 50 may programmatically determine audience membership and determine a bidding amount for submitting a bid to an online auction to provide an advertisement to a given user. To facilitate relatively fast responses to such time sensitive requests, some embodiments may pre-calculate zone classifications and audience classifications and index those classifications according to parameters of a content request (e.g., according to key values based on (such as hash values of) one or more of a device or user identifier, a geographic location, and a category of time corresponding to the time tile records). In some cases, bidding may be real-time, e.g., within less than 500 milliseconds of when an ad is requested, and often even sooner. In other cases, advertising space may be pre-purchased programmatically before ad requests, e.g., based on expected audience behavior in the coming hours or days. In other cases, other types of content may be programmatically targeted, e.g., business listings or articles based on audience membership. Programmatic targeting based on audience classification is expected to reduce labor costs relative to manual tuning and targeting of content. That said, not all embodiments necessarily provide these benefits, which is not to suggest that any other feature may not also be omitted in some cases.

Some embodiments may include an anonymized-user-identifier matcher 58, an example of which is described in U.S. patent application Ser. No. 14/334,066, the entire contents of which are incorporated by reference. In some cases, a user may switch mobile devices or be reassigned a device identifier. Re-creating a user profile for that user based on the new identifier can be time-consuming and particularly difficult at commercially-relevant scales. Accordingly, some embodiments of the matcher 58 may detect matches between geolocation patterns of a new user identifier and an old user identifier to assign that new identifier to an existing user profile when such matches are detected. This is expected to yield more accurate classifications of audiences based on more complete data for individuals using two different devices. That said, not all embodiments necessarily provide these benefits, which is not to suggest that any other feature may not also be omitted in some cases.

Some embodiments may further include a geographic-data projector 60, an example of which is described in U.S. patent application Ser. No. 13/938,974, the entire contents of which are incorporated by reference. In some cases, geographic-data providers may provide data at a relatively low resolution, e.g., census data reported at the zip code level. Some embodiments may un-evenly project such values onto higher-resolution geographic areas (e.g., some instances of the tile records or corresponding geographic features) within the low-resolution area based on a distribution of a population within that larger geographic area. Accordingly, some embodiments may enrich the records of the geographic information system 36 by which audiences and zones are identified with information that would otherwise be inapplicable or inaccurately applied. That said, not all embodiments necessarily provide these benefits, which is not to suggest that any other feature may not also be omitted in some cases.

The profiles may characterize a variety of attributes of users. In one illustrative use case, a location history may indicate that a user frequently visits geographic locations associated with tourism, and the profile of that user may be updated to indicate that the user frequently engages in tourism, which may be of interest to certain categories of advertisers. Or a user may spend their working hours in geographic areas associated with childcare and residences, and based on their location history, the profile of that user may be updated to indicate that the user likely engages in childcare for children younger than school age. Other examples are described below.

Further, as explained in detail below, the attributes associated with geographic locations may vary over time (for example, an area with coffee shops and bars may have a stronger association with consumption of breakfast or coffee in the morning, an association which weakens in the evening, while an association with entertainment or nightlife may be weaker in the morning and stronger in the evening). User profiles may be generated in accordance with the time-based attributes that predominate when the user is in a geographic area. And in some embodiments, user profiles may also be segmented in time, such that a portion of a given user's profile associated with a weekday morning may have different attributes than another portion of that user's profile associated with a weekend night, for instance.

The user profiles may be used by advertisers and others in a privacy-friendly fashion, such that users are expected to tend to opt in to sharing their location history. For example, the user profiles may be aggregated to identify geographic areas having a high density of a particular type of user at a particular time of the week, such as a sports stadium having a relatively large number of users associated with fishing as a hobby, or a children's soccer field in which a relatively large number of people associated with golfing as a hobby might tend to co-occur on weekend mornings. Such correlations may be presented to advertisers or others without disclosing information by which individual users can be uniquely identified. In other applications, user-specific information may be provided, for example, users who opt in to sharing their profiles may receive user-specific services or communications formulated based on the individual profile of that user.

Accounting for time when characterizing geographic areas is believed to yield relatively accurate characterizations of places, as the activities that people engage in at a given location tend to depend strongly on time of day and week. And for similar reasons, accounting for time when profiling users is expected to yield relatively accurate characterizations of the users. Generating profiles based on location history further offers the benefit of profiling users without imposing the burden of manually doing so on the users themselves, and using attributes of geographic areas in which the user travels is expected to yield relatively privacy-friendly data about the user. That said, not all embodiments offer all, or any, of these benefits, as various engineering and cost trade-offs are envisioned, and other embodiments may offer other benefits, some of which are described below.

As noted above, the user profiler 12 obtains data from the mobile devices 16 and the geographic information system 18 to output user profiles to the user-profile datastore 14 for use by the ad servers 22 or for other purposes. Accordingly, these components are described in this sequence, starting with inputs, and concluding with outputs.

The mobile devices 16 maybe any of a variety of different types of computing devices having an energy storage device (e.g., a battery) and being capable of communicating via a network, for example via a wireless area network or a cellular network connected to the Internet 20. In some cases, the mobile devices 16 are handheld mobile computing devices, such as smart phones, tablets, or the like, or the mobile devices may be laptop computers or other special-purpose computing devices, such as an automobile-based computer (e.g., an in-dash navigation system). The mobile devices 16 may have a processor and a tangible, non-transitory machine-readable memory storing instructions that provide the functionality described herein when executed by the processor. The memory may store instructions for an operating system, special-purpose applications (apps), and a web browser, depending upon the use case. It should be noted, however, that the present techniques are not limited to mobile devices, and other computing devices subject to geolocation may also generate data useful for forming user profiles. For instance, set-top boxes, gaming consoles, or Internet-capable televisions may be geolocated based on IP address, and data from user interactions with these devices may be used to update user profiles, e.g., with user interaction indicating a time at which a user was at the geolocation corresponding to the device.

This software may have access to external or internal services by which the location of the mobile device may be obtained. For example, the mobile device may have a built-in satellite-based geolocation device (for instance a global-positioning system, or GPS, device or components operative to obtain location from other satellite-based systems, such as Russia's GLONASS system or the European Union's Galileo system). In another example, location may be obtained based on the current wireless environment of the mobile device, for example by sensing attributes of the wireless environment (e.g. SSIDs of wireless hotspots, identifiers of cellular towers and signal strengths, identifiers of low energy Bluetooth beacons, and the like) and sending those attributes to a remote server capable of identifying the location of the mobile device. In some embodiments, the location may be obtained based on an identifier of a network node through which the mobile device connects to the Internet, for example by geocoding an IP address of a wireless router or based on a location of a cellular tower to which the mobile device is connected. The location may be expressed as a latitude and longitude coordinate or an area, and in some cases may include a confidence score, such as a radius or bounding box defining area within which the device is expected to be with more than some threshold confidence.

From time to time, the location of the mobile devices 16 may be obtained by the mobile devices. For example, when a user interacts with a special-purpose application, in some cases, the application may have permission to obtain the location of the mobile device and report that location to a third party server associated with the application, such that the location may be obtained by the user profiler 12 from the third party server. In another example, the user may visit a website having code that obtains the current location of the mobile device. This location may be reported back to the server from which the website was obtained or some other third party server, such as an ad server for an affiliate network, and location histories may be obtained from this server. In another example, locations of the mobile devices 16 may be obtained without the participation of the mobile device beyond connecting to a network. For instance, users may opt in to allowing a cellular service provider to detect their location based on cellular signals and provide that location to the user profiler 12. Depending upon how location is obtained, the location may be acquired intermittently, for example at three different times during a day when a user launches a particular application, or relatively frequently, for example by periodically polling a GPS device and reporting the location. In some cases, the location history may include locations obtained more than one-second apart, more than one-minute apart, more than one-hour apart, or more, depending upon the use case.

Locations may be obtained in real time from mobile devices 16 by the user profiler 12, or in some embodiments, location histories may be obtained, e.g., from third party data providers. Each location history may include records of geographic locations of a given mobile device and when the mobile device was at each location. In some cases, a location history may include records of location over a relatively long duration of time, such as more than over a preceding hour, day, week, or month, as some modes of acquiring location histories report or update location histories relatively infrequently. A location history for a given mobile device may include a plurality (e.g., more than 10 or more than 100) location records, each location record corresponding to a detected location of the mobile device, and each location record including a geographic location and the time at which the mobile device was at the location. The location records may also include a confidence score indicative of the accuracy of the detected location. Geographic locations may be expressed in a variety of formats with varying degrees of specificity, for example as a latitude and longitude coordinates, as tiles in a grid with which a geographic area is segmented (e.g., quantized), or in some other format for uniquely specifying places.

The geographic information system 18 may be configured to provide information about geographic locations in response to queries specifying a location of interest. In some embodiments, the geographic information system 18 organizes information about a geographic area by quantizing (or otherwise dividing) the geographic area into area units, called tiles, that are mapped to subsets of the geographic area. In some cases, the tiles correspond to square units of area having sides that are between 10-meters and 1000-meters, for example approximately 100-meters per side, depending upon the desired granularity with which a geographic area is to be described. In other examples, the tiles have other shapes, e.g., hexagon shapes that are arranged in a two-dimensional hexagonal packing layout.

In some cases, the attributes of a geographic area change over time. Accordingly, some embodiments divide each tile according to time. For instance, some embodiments divide each tile into subsets of some period of time, such as one week, one month, or one year, and attributes of the tile are recorded for subsets of that period of time. For example, the period of time may be one week, and each tile may be divided by portions of the week selected in view of the way users generally organize their week, accounting, for instance, for differences between work days and weekends, work hours, after work hours, mealtimes, typical sleep hours, and the like. Examples of such time divisions may include a duration for a tile corresponding to Monday morning from 6 AM to 8 AM, during which users often eat breakfast and commute to work, 8 AM till 11 AM, during which users often are at work, 11 AM till 1 PM, during which users are often eating lunch, 1 PM till 5 PM, during which users are often engaged in work, 5 PM till 6 PM, during which users are often commuting home, and the like. Similar durations may be selected for weekend days, for example 8 PM till midnight on Saturdays, during which users are often engaged in leisure activities. Each of these durations may be profiled at each tile.

In some embodiments, the geographic information system 18 includes a plurality of tile records, each tile record corresponding to a different subset of a geographic area. Each tile record may include an identifier, an indication of geographic area corresponding to the tile (which for regularly size tiles may be the identifier), and a plurality of tile-time records. Each tile-time record may correspond to one of the above-mentioned divisions of time for a given tile, and the tile-time records may characterize attributes of the tile at different points of time, such as during different times of the week. Each tile-time record may also include a density score indicative of the number of people in the tile at a given time. In some embodiments, each tile-time record includes an indication of the duration of time described by the record (e.g. lunch time on Sundays, or dinnertime on Wednesdays) and a plurality of attribute records, each attribute record describing an attribute of the tile at the corresponding window of time during some cycle (e.g., weekly).

The attributes may be descriptions of activities in which users engage that are potentially of interest to consumers of the user-profile datastore 14. For example, some advertisers may be interested in when and where users go to particular types of restaurants, when and where users play golf, when and where users watch sports, when and where users fish, or when and where users work in particular categories of jobs. In some embodiments, each tile-time record may include a relatively large number of attribute records, for example more than 10, more than 100, more than 1000, or approximately 4000 attribute records, depending upon the desired specificity with which the tiles are to be described. Each attribute record may include an indicator of the attribute being characterized and an attribute score indicating the degree to which users tend to engage in activities corresponding to the attribute in the corresponding tile at the corresponding duration of time. In some cases, the attribute score (or tile-time record) is characterized by a density score indicating the number of users expected to engage in the corresponding activity in the tile at the time.

Thus, to use some embodiments of the geographic information system 18, a query may be submitted to determine what sort of activities users engage in at a particular block in downtown New York during Friday evenings, and the geographic information system 18 may respond with the attribute records corresponding to that block at that time. Those attribute records may indicate a relatively high attribute score for high-end dining, indicating that users typically go to restaurants in this category at that time in this place, and a relatively low attribute score for playing golf, for example. Attribute scores may be normalized, for example a value from 0 to 10, with a value indicating the propensity of users to exhibit behavior described by that attribute.

The user profiler 12 may join the location histories and tile records implicated by locations in those location histories to generate user profiles. Thus, users may be characterized according to the attributes of the places those users visit at the time the user visits those places. The generated user profiles may then be stored by the user profiler 12 in the user-profile datastore 14, as described below. To this end, or others, some embodiments of the user profiler 12 includes a location-history acquisition module 24, a location-attribute acquisition module 26, and a user-attribute updater 28 operative to generate user profiles.

The user profiler 12 may be constructed from one or more of the computers described below with reference to FIG. 3. These computers may include a tangible, non-transitory, machine-readable medium, such as various forms of memory storing instructions that when executed by one or more processors of these computers (or some other data processing apparatus) cause the computers to provide the functionality of the user profiler 12 described herein. The components of the user profiler 12 are illustrated as discrete functional blocks, but it should be noted that the hardware and software by which these functional blocks are implemented may be differently organized, for example, code or hardware for providing the this functionality may be intermingled, subdivided, conjoined, or otherwise differently arranged.

The illustrated location-history acquisition module 24 may be configured to acquire location histories of mobile devices 16 via the Internet 20. The location histories may be acquired directly from the mobile devices 16, or the location histories may be acquired from various third parties, such as a third-party hosting Web applications rendered on the mobile devices 16, third parties hosting servers to which location histories are communicated by apps on the mobile devices 16, or third parties providing network access to the mobile devices 16, such as cellular service providers, for example. The location-history acquisition module 24 may include a plurality of sub-modules for obtaining location histories from a plurality of different providers. These sub-modules may be configured to request, download, and parse location histories from a respective one of the different providers via application program interfaces provided by those providers. The sub-modules may normalize the location histories from the different providers, which may be in different formats, into a common format for use in subsequent processing. Location histories may be acquired periodically, for example monthly, weekly, or hourly, or more frequently.

The user profiler 12 of this embodiment further includes the location-attribute acquisition module 26. The module 26 may be configured to obtain attributes of locations identified based on the location histories acquired by the location history acquisition module 24. For example, the module 26 may be configured to iterate through each location identified by each location history and query the geographic information system 18 for attributes of those locations at the time at which the user was at the corresponding location. In some cases, the location-attribute acquisition module 26 may also request attributes of adjacent locations, such as adjacent tiles, from the geographic information system 18 so that the user-attribute updater 28 can determine whether a signal from a given tile is consistent with that of surrounding tiles for assessing the reliability of various indications.

The acquired location histories and location attributes may be provided by modules 24 and 26 to the user-attribute updater 28, which in some embodiments, is configured to generate user profiles based on this data. In some cases, the user-attribute updater 28 is operative to attach attributes of places visited by users to the profile of those users. These profiles may be stored by the user attribute updater 28 in the user-profile datastore 14.

The user profile datastore 14 may be operative to store user profiles and, in some embodiments, address queries for data in the user profiles. The illustrated user-profile datastore 14 includes a plurality of user-profile records, each record corresponding to the profile of a given user or a given mobile device 16. Each user-profile record may include an identifier of the record (which may be a value otherwise uncorrelated with the identity of the user to enhance privacy), and an identifier of the source or sources of the location histories from which the profile was created such that subsequent location histories can be matched with the profile (e.g. a account associated with a special-purpose application, a cell phone number, or some other value, which may be hashed to enhance user privacy).

Each user-profile record may also include a plurality of profile time records indicating attributes of the user profile at different times during some cycle of time (e.g., portions of the week or month, or during other periods like those described above with reference to the geographic information system 18). In some cases, the profile-time records may correspond to the same durations of time as those of the time-tile records described above. Each profile-time record may include an indication of the duration of time being described (e.g. Thursday's at dinnertime, or Saturday mid-morning) and a plurality of profile attribute records, each profile attribute record indicating the propensity of the corresponding user to engage in an activity described by the attribute during the corresponding time of the profile-time record. The profile time records may allow tracking of when users tend to engage in a given activity (time of day, day of week, week of year). In some embodiments, the profile attribute records correspond to the same set of attribute records described above with reference to the geographic information system 18. Each profile-attribute record may include an indication of the attribute being characterized (e.g., attending a children's soccer game, having brunch at a fast-casual dining establishment, parent running errands, or shopping at a mall) and a score indicating the propensity of the user to engage in the activity at the corresponding time, such as a normalized value from 0 to 10. The attribute records may further include a sample size, indicative of the number of samples upon which the attribute score is based, for weighting new samples, and a measure of variance among these samples (e.g., a standard deviation) for identifying outliers.

As described below, the user-profile records may be used for a variety of purposes. For example, advertisers operating ad servers 22 may submit to the user-profile datastore 14 a query identifying one of the user-profile records, such as the above-mentioned hashed value of a user account number or phone number, and the user-profile datastore 14 may respond with the attributes of the corresponding user at the current time. In some embodiments, to further enhance user privacy, queries may be submitted for a specific attribute to determine whether to serve an advertisement corresponding to the attribute, or a query may request a binary indication of whether the attribute score is above a threshold.

In another example, the user-profile datastore 14 may be used by the user profiler 12 to augment the records in the geographic information system 18. For example, an index may be created for each attribute that identifies tiles where users having relatively strong scores (e.g. above a threshold) for the respective attribute tend to co-occur at given times. These indices may correspond to heat maps (though no visual representation need be created) indicating where, for example, users interested in golf, tend to be during various times of the day, such that advertisers can select advertisements based on this information. In some embodiments, an index may be created for each user attribute at each of the above-described divisions of time in the geographic information system 18, and these indices may be queried to provide relatively prompt responses relating to where users having a given attribute or combination of attributes tend to co-occur at various times. Precalculating the indices is expected to yield faster responses to such queries than generating responsive data at the time the query is received. For instance, using examples of these indices relating to fishing and employment in banking, an advertiser may determine that people who engage in fishing on the weekend and work in banking tend to drive relatively frequently along a particular stretch of road on Mondays during the evening commute, and that advertiser may purchase an advertisement for bass fishing boats on a billboard along that road in response. Other examples relating to customization of software and services and other forms of analysis are described in greater detail below.

In short, some embodiments of the computing environment 10 generate user profiles that are relatively privacy-friendly to users and consume relatively little effort on the part of users or others to create the profiles. These advantages are expected to yield a relatively comprehensive set of relatively high-resolution user profiles that may be used by advertisers and others seeking to provide information and services customized to the unique attributes of each user, facilitating the presentation of high-value and high-relevance advertisements and services to users while respecting the users' interest in privacy. That said, not all embodiments provide these benefits, and some embodiments may forgo some or all of these embodiments in the interest of various engineering trade-offs relating to time, cost, and features.

Figure 2:
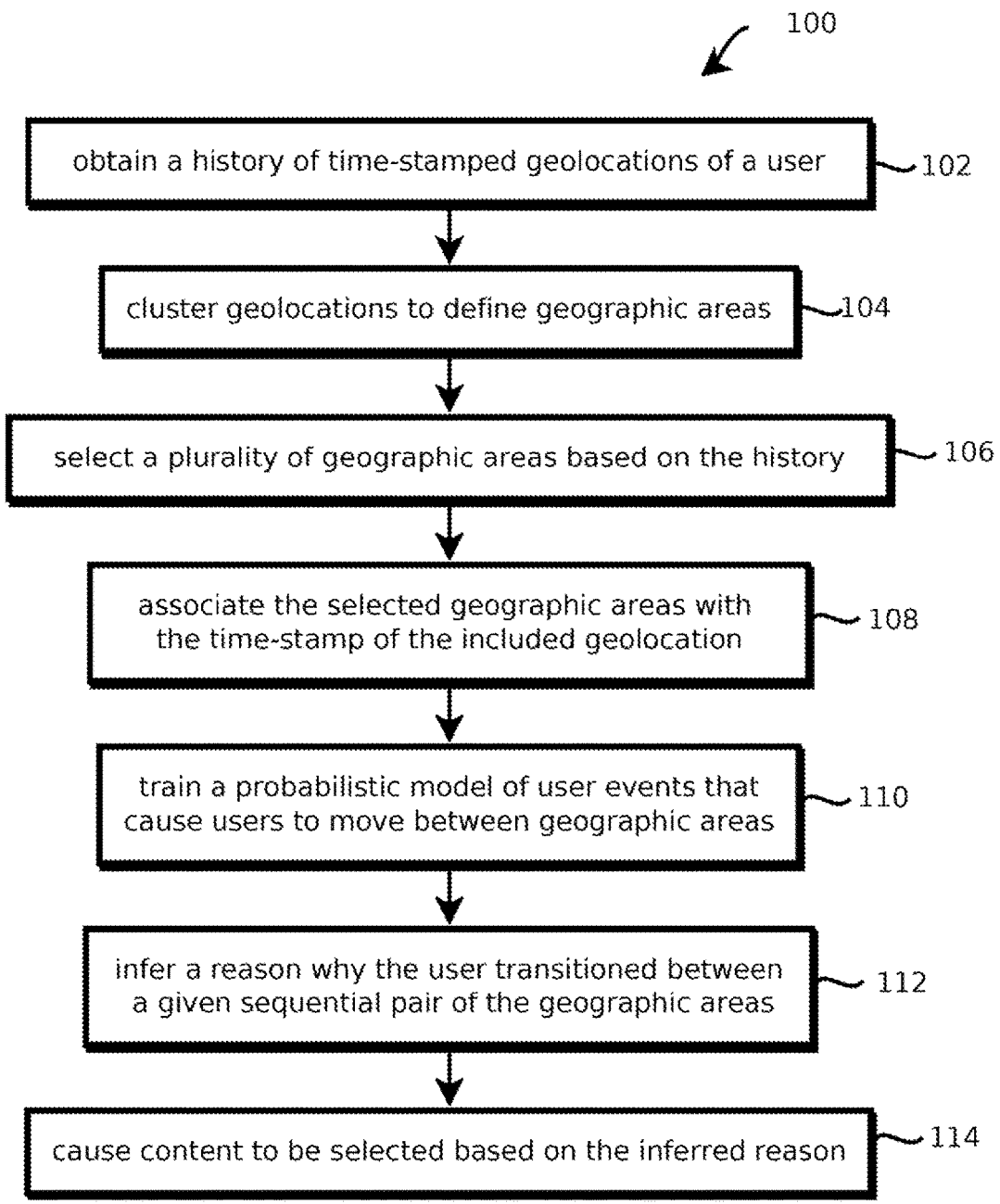
FIG. 2 shows an example of a process by which the sequence of events that caused a user to move between geographic areas may be inferred.

FIG. 2 shows an example of a process 100 for inferring a reason, or sequence of reasons, a user moved between geolocation sensed by a mobile device. In some embodiments, the process 100 may be executed, in part, by the above-described user profiler based on geolocations reported by user devices in the fashion above. Other parts of process 100, such as content selection, may be performed by the above-described programmatic content targeter. In some cases, reported geolocations may span a trailing duration, such as the trailing duration of several weeks, and may in some cases include a substantial number of geolocations for a given user, such as more than 20, and in many cases more than 100. In some embodiments, some of the steps of the process 100 may be performed as a batch process, for example, daily or weekly, well in advance of when the resulting data is used, for example, to select content.

In some cases, there may be a desire to select content or make other determinations based on the underlying causes of why users move from one geolocation to the next. For instance, an advertiser may wish to target ads to a user who has experienced a sequence of events that are evidenced, at least in part, by resultant geolocations in which the user was detected, but this sequence of events may itself remain unknown to the advertiser beyond probabilistic inferences that can be drawn from the locations. In one example, a user may travel from their residential neighborhood to another city in which they have a family member, the underlying cause or event being a visit to a friend or family member in that city. This event may be followed by a trip to a store that sells products related to babies, the underlying event (or cause) being shopping for baby related items. From this sequence, an advertiser may wish to select ads relevant to a baby shower in honor of a close friend or family member, such as ads for a store for equipment related to babies or to target the user with advertisements relating to complementary goods. In another example, a user may transition from their location of work to the geographic area in which a hardware store is located and then to another geographic area in which landscaping products are sold, and then finally home, with the underlying causes for events being leaving work, shopping for hardware, shopping or landscaping plans, and traveling home. An advertiser may wish to serve advertisements in view of these events, and in particular in view of the sequence of events, for instance, to target the user with advertisements related to home repair likely occurring in the immediate future, and in particular home repair that likely encompasses the exterior of the house, such as the landscaping.

In many cases, the system 12 generally does not have a direct indication of the underlying events experienced by users that the user to move between two different locations. To mitigate this problem, some embodiments may construct probabilistic models that can be trained to infer the underlying causes based on the information that is available, such as based on a time series of timestamped geolocations, for instance, latitude-longitude coordinates, tiles the user visited, businesses the user visited, or polygons of the user visited. These locations may be based on data reported by a user's cell phone, for instance, in previous ad requests, or based on geocoded IP addresses of the user, for example, from a desktop computer or set-top box. In some cases, constructing the probabilistic models may be performed by training the models on a training set of historical data corresponding to an individual user, or corresponding to a collection of users, such as users having similar attributes, for instance, with users in a similar or the same audience as the given user. In some embodiments, these models may be trained concurrently for a plurality of users, for instance, on multiple instances of computer systems like those described below with reference to FIG. 3. In some embodiments, training may be expedited by sending data relevant to the analysis performed by each of these computer systems to the computer systems in advance of training, such that the computer system may perform relatively few or no subsequent request for data in a given iteration.

In some cases, the illustrated process 100 begins with obtaining a history of time-stamped geolocation of the user, as indicated by block 102. Examples of obtained geolocations are described above with reference to the various identifiers of geographic areas, including time tiles, polygons, business locations, lat/long coordinates, and the like. In some cases, the time-stamped geolocations are obtained based on data from one or more computing devices associated with a given user and reported to one or more remote server systems, for instance, in advertising requests. In some cases, the obtained history includes a subset that is relatively recent, for instance, corresponding to a current day or current week, which may pertain to a current query, and a larger set relating to a longer trailing duration, for instance, the preceding month, preceding year, or preceding two years, which may be used for training the probabilistic model. The model, once trained, may then be applied to the more recent subset to make inferences about a user's current sequence of events driving their behavior.

Next, some embodiments may cluster the geolocations to define geographic areas, as indicated by block 104. In some embodiments, the geolocations may be clustered geographically, based on the geographic distance between geolocations in the history. In some embodiments, the geolocations are clustered by executing a DBSCAN clustering algorithm. Some embodiments may execute a density-based clustering algorithm, like DBSCAN, to establish groups corresponding to the resulting clusters and exclude outliers. Some embodiments may examine each of the geolocations reflected in the records and designate a tile (or other geolocation designator) as a core tile if at least a threshold amount of the other tiles (or other geolocation designator) in the records are within a threshold geographic distance or number of tiles (or other geolocation designator). Some embodiments may then iterate through each of the tiles and create a graph of reachable geolocations, where nodes on the graph are identified in response to non-core corresponding tiles being within a threshold distance of a core tile in the graph, and in response to core tiles in the graph being reachable by other core tiles in the graph, where two tiles are reachable from one another if there is a path from one tile to the other tile where every link and the path is a core tile and the tiles in the link are within a threshold distance of one another. The set of nodes in each resulting graph, in some embodiments, may be designated as a cluster, and points excluded from the graphs may be designated as outliers that do not correspond to clusters. Or other embodiments may use other types of clustering algorithms, for example, a K-means clustering algorithm or an EnDBSCAN or OPTICS algorithm.

In some cases, the geographic areas may be defined based on the corresponding one of the clusters, for instance, with each geographic area being mapped to a corresponding cluster. In some cases, the geographic areas may be bounding polygons, with vertices specified by latitude and longitude coordinates calculated by applying a convex hull algorithm to the corresponding cluster. In some cases, the convex hull may be calculated with a Jarvis March algorithm to favor simplicity in development at the expense of additional computational complexity. In another example, the convex hull may be calculated with the Graham scan, Quickhull, or Divide and conquer convex hull algorithm, at the expense of additional development complexity but with the benefit of potentially faster runtimes. Other examples include Chan's algorithm and the ultimate planar convex hull algorithm. Or in some cases, geographic areas may be defined by collections of tiles, or the smallest bounding square or rectangular shape including the geolocation in a cluster.

Next, some embodiments may select a plurality of geographic areas based on the geolocations of the user, as indicated by block 106. During a training operation, geographic areas may correspond to geolocations extending into more distant time periods, while at query time, or during, for instance, daily or hourly preprocessing, the selected areas may correspond to a more recent subset of the geolocations in the history. In some cases, the number of geographic areas may be larger than three, five, or 10 geographic areas, depending upon the desired resolution of the analysis and depth of event sequences desired. In some cases, the geographic areas may be selected by identifying which of the defined geographic areas include at least one of the time-stamped geolocations an issue. In some cases, a given geolocation may be determined to be within a geographic area by executing a ray casting algorithm, for instance, by counting the number of times a ray starting from the geolocation and extending in any fixed direction intersects the edges of the bounding polygon of a geographic area. Some embodiments may determine whether the count is even, in which case the geolocation may be determined to be outside of the bounding polygon of the geographic area, or the count may be determined to be odd, in which case some embodiments may determine that the geolocation is within the bounding polygon of the geographic area. Other embodiments may use other techniques, such as a Winding Number algorithm.

Next, some embodiments may associate the selected geographic areas with the time-stamp of the included geolocations, as indicated block 108. In some embodiments, a plurality of geolocations in a given geographic area, for instance, within a threshold duration of time, like a single day, and uninterrupted by intervening geolocations in other geographic areas, may be consolidated into a single time-stamp, for instance, based on a measure of central tendency of the time-stamps, or based on a first or last time. In some cases, a single geographic area may be associated with multiple time-stamps, for instance, when a user travels from one geographic area to another and then back. In some cases, the association of time-stamps with the geographic areas may yield a time series of geographic areas, in which, in some cases, a single geographic area may occur multiple times at different points in the time series.

Next, some embodiments may train a probabilistic model of user events that cause users to move between geographic areas, as indicated by block 110. In some cases, training may occur relatively far in advance of query time (to expedite query responses) and based on relatively long durations of location histories. In some embodiments, the probabilistic model is a hidden Markov model, and the model may be trained with the Baum-Welch algorithm.

In some embodiments, the model includes a plurality of predefined candidate user events. The candidate user events may be underlying causes that lead to given user to move from one geographic area to another other, for reasons with more specificity than the plainly evident desire to be at the other geographic area. Examples of underlying user events can include things like going to work, going home, going shopping for a particular category of goods, engaging in various types of entertainment, engaging in various social events, and engaging in various activities. The candidate events may be obtained empirically, for instance, by surveying users about their location history and the rationale for changing location, or the candidate events may be generated based on informed guesses about things that likely motivated users. In some embodiments, the number of candidate user events may be larger than five, for instance, larger than 50 or 500, depending upon desired resolution of the analysis and available computing capacity.

In some embodiments, the probabilistic model includes probabilities of the user transitioning sequentially from one candidate user event to another candidate user event within the plurality of predefined candidate user events. In some cases, a probability is obtained for every two event permutation among the probability, including in some cases, repetition of the same candidate user event. In some cases, these probabilities may be characterized as a two-dimensional matrix, with rows and columns corresponding to the set of candidate user events, and items in the matrix corresponding to the probability of an event at a given row being transitioned to from an event at a given column, or vice versa. In some embodiments, the set of transitions for a given event to each of the candidate events in the plurality sums to a value of one, thus, in some cases, the number of probabilities of the user transitioning between each pair of the candidate events may be equal to $N(N-1)$, where N is the number of predefined candidate user events. By way of example, one probability may be the probability of a user engaging in a candidate user event corresponding to playing soccer sequentially after engaging in a candidate user event corresponding to shopping for sporting goods. This example may have a higher probability than another example in which a user engages in the candidate user event corresponding to playing soccer sequentially after engaging in a candidate user event corresponding to going to work. In some cases, these probabilities may be transition probabilities in a hidden Markov model in which the candidate user events are the hidden states of the model.

In some embodiments, the probabilistic model may also include probabilities of obtaining a geolocation reported by the computing devices associated with the user in each of the plurality of geographic areas following (which may include during) the occurrence of each of the candidate user events. In some embodiments, each candidate user event may be associated with the probability for each of the geographic areas, and that probability may indicate the likelihood of the user being in that corresponding geographic area following the respective candidate user event. In some embodiments, these probabilities may be the emission probabilities in a hidden Markov model. In some embodiments, the number of these probabilities may be equal to $N(M-1)$ wherein N is the number of candidate user events, and M is the number of geographic areas, and stored in a two-dimensional matrix with rows corresponding to the candidate geographic areas and columns corresponding to the candidate user events, or vice versa.

In some embodiments, the model may be trained by obtaining an initial set of probabilities for the model, which may be chosen randomly, or maybe selected based on an informed guess by the operator. Next, in training, the training set of one or more of the sequences of geographic areas may be obtained, for instance, with a history of geolocations of the user over some trailing duration. Next in training, some embodiments may calculate the above-described probabilities by repeatedly performing a probability estimation process until the probability estimation process converges, for instance, as indicated by a determination that sequential changes in the probabilities (e.g., a root-mean-square of the differences) between consecutive iterations of the probability estimation process are less than the threshold amount.

In some embodiments, the probability estimation process includes estimating the probabilities of the user transitioning between each pair of the candidate user events based on the training set and the initial set of probabilities or a revised set of probabilities if the revised set is available. In some cases, this estimation includes, for each of the probabilities of the user transitioning between each pair of the candidate user events, performing steps including: for each of a plurality of pairs of sequential geographic areas in the training set, calculating a component probability of the user transitioning between the respective pair of candidate user events and a highest probability of the respective pair of sequential geographic areas based on the initial set of probabilities or the revised set of probabilities if the revised set of probabilities is available; and dividing a sum of the component probabilities by a sum of the highest probabilities to form an estimated probability of the user transitioning between the respective pair of the candidate user events.

Next, in some embodiments, the probability estimation process includes normalizing the estimated probabilities of the user transitioning between each pair of the candidate user events to form revised probabilities of the user transitioning between each pair of the candidate user events. In some cases, normalizing the estimates includes scaling the estimates such that the set of estimates corresponding to a given candidate user event sum to a value of one, for instance, by dividing each of the estimates by the total of all the estimates for the given candidate user event.

Next, in some embodiments, the probability estimation process includes estimating the probabilities of obtaining a geolocation reported by the computing devices associated with the user based on the training set and the revised probabilities of the user transitioning between each pair of the candidate user events. In some cases, this estimation includes the following steps: for each given geographic area in the training set, for each given candidate user event, and for each of a plurality of pairs of sequential geographic areas in the training set, calculating a component probability of the respective pair of sequential geographic areas assuming the respective given geographic area followed the respective given candidate user event and a highest probability of the respective pair of sequential geographic areas occurring in the set based on the initial set of probabilities or a revised set of probabilities if the revised set of probabilities is available; and dividing a sum of the component probabilities by a sum of the highest probabilities to form an estimated probability of obtaining a geolocation reported by the computing devices associated with the user in the respective given geographic area assuming the respective given candidate user event occurred.

Next, some embodiments of the probability estimation process include normalizing the estimated probabilities of obtaining a geolocation reported by the computing devices associated with the user to form revised probabilities of obtaining a geolocation reported by the computing devices associated with the user. In some cases, normalizing may include scaling the probabilities at issues such that the probabilities for each candidate user event sum to one, for instance, by dividing each such probability by the total of all the geographic area probabilities for the candidate user event at issue.

The revised probabilities from the two normalization steps in the probability estimation process at each iteration may collectively form the revised set of probabilities, which may be used in a subsequent iteration of the probability estimation process, which may continue until the process is determined to have converged.

Other embodiments may use other types of models, such as recurrent neural nets, for drawing inferences about underlying causes. In some cases, a recurrent neural net may be trained based on the training sets described above, for instance, by executing a stochastic gradient descent algorithm. In some cases, the gradient descent algorithm is a back propagation time algorithm. In some cases, the stochastic gradient descent algorithm is repeated for different initial conditions of the recurrent neural net to confirm that the different initial conditions converge to the same minima, rather than two different minima potentially corresponding to one or more local minima in an error function. In some cases, training may be cross validated by withholding different subsets of the training data and testing the resultant trained models on the withheld data to cross validate the model.

Next, some embodiments may infer a reason why the user transitioned between a given sequential pair of the geographic areas, as indicated in block 112. In some embodiments, this inference may be based on a previously trained part model and a relatively recent subset of the history of timestamps geolocations of the user, such as geolocations within the current day or precedent four hours. In some embodiments the reason inferred includes, or is, one of the predetermined candidate user events. In some embodiments, the inference may be based on the forward-backward algorithm. In some embodiments, inferring the reason why the user transitioned between the given sequential pair of the geographic states may incur inferring a sequence of reasons why the user transition between a sequence of sequential pairs of geographic states in the time-series of geographic areas. In some cases, multi-event sequences may be inferred based on the Vetirbi algorithm.

In some cases, a sequence of candidate user events may be selected to explain an observed sequence of geographic areas in the time series of geographic areas with the following steps. for a given one of inferred events calculating most probable candidate sequences of the events that lead to a respective sequentially previous candidate event in the inferred sequence for each of the candidate events; and selecting the given one of the inferred events based on the calculated probabilities of the most probably candidate sequences for the previous candidate events, respective probabilities of transitioning to each candidate event for the given one of the inferred events, and respective probabilities of obtaining a geolocation in the history in the geographic area corresponding temporally to the given one of the inferred events. In some cases, these steps may be performed recursively through each sequence in the inferred sequence of candidate user events, building upon the calculated most probable candidate sequences from previous iterations.

In some embodiments, a plurality of sequences but candidate user events, or a plurality of candidate user events, maybe reported, each with a corresponding probability. In some cases, these probabilities may be combined with other factors, for instance, in a weighted combination to select content.

Next, in the illustrated process 100, some embodiments may cause content to be selected based on the inferred reason, as indicated by block 114. Selecting content may include selecting advertisements to send in response to the currently received advertisement request from the user, or selecting content may include selecting query results or determining whether, or an amount, to bid in an advertising auction. For instance, a given advertiser may determine that they wish to increase their bid amount by 10% whenever a user is determined to be engaging in a specified sequence of events with greater than a threshold probability. Or a merchant may select products to recommend to a user in response to a mapping between those products and an identified inferred sequences of events. In other examples, the identified sequences of events may be associated with the geographic areas or corresponding tiles in the above-noted geographic information system, for instance, as attributes having attribute scores indicating the likelihood of a user in those geographic areas having undergone the corresponding sequences of events.

Figure 3:
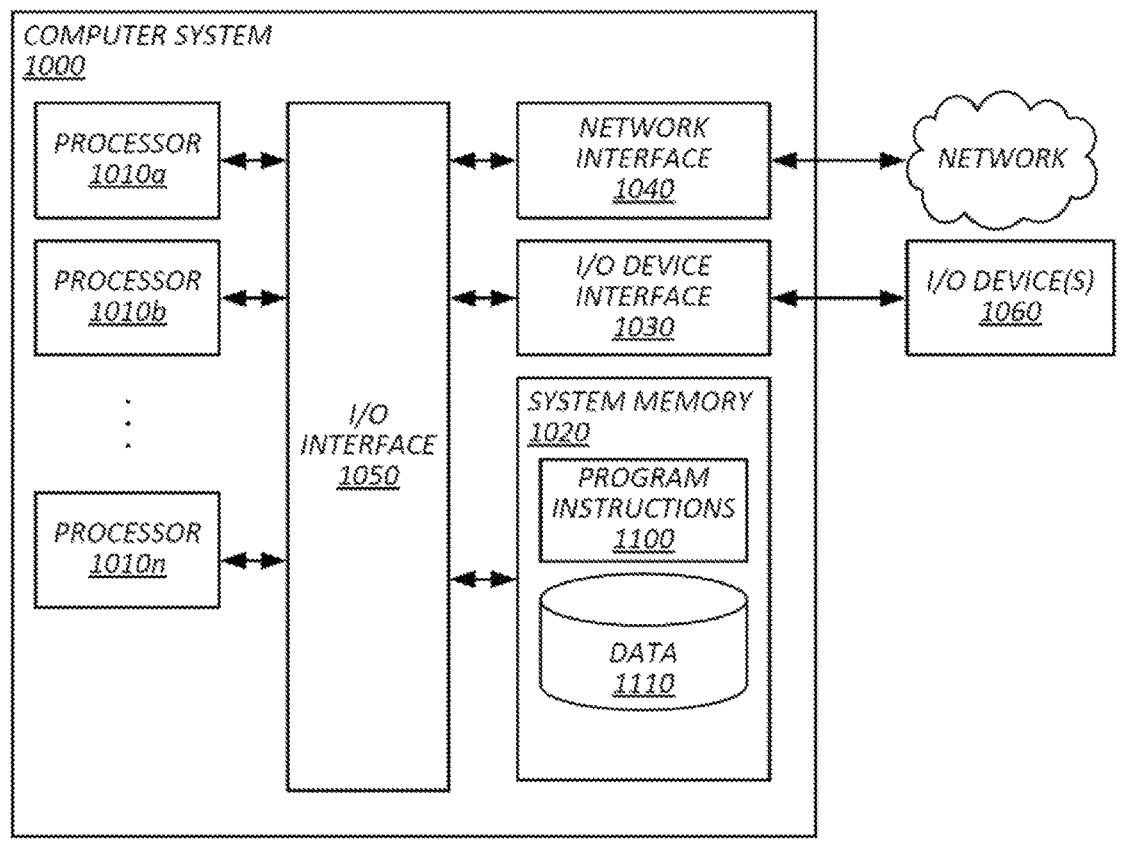
FIG. 3 shows an embodiment of a computer system by which the above-mentioned systems and processes may be implemented.

FIG. 3 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030 and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computing system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). In some embodiments, the program may be conveyed by a propagated signal, such as a carrier wave or digital signal conveying a stream of packets.

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, any such conflicting text in such incorporated by reference U.S. patents, U.S. patent applications, and other materials is specifically not incorporated by reference in this patent.

The present techniques will be better understood with reference to the following enumerated embodiments:

1. A method of inferring a user's reason for movement between geolocations sensed by a mobile device of the user, the method comprising: obtaining a history of time-stamped geolocations of a user, the time-stamped geolocations being obtained based on data from one or more computing devices associated with the user and reported to one or more remote server systems; selecting a plurality of geographic areas based on each of the selected geographic areas including at least one of the time-stamped geolocations; associating the selected geographic areas with the time-stamp of the included geolocation to establish a time series sequence of the geographic areas; obtaining a probabilistic model specifying parameters comprising: a plurality of candidate user events, each candidate user event being an underlying potential reason why the user moved between geographic locations; probabilities of the user transitioning between each pair of the candidate user events; and probabilities of obtaining a geolocation reported by the computing devices associated with the user in each of the plurality of geographic areas following occurrence of each of the candidate user events; inferring a reason why the user transitioned between a given sequential pair of the geographic areas in the time series sequence of geographic areas based on the model, wherein the reason comprises one of the candidate user events; and storing the inferred reason in memory.

2. The method of embodiment 1, wherein: the geographic areas include at least three geographic areas; the geographic areas are obtained by clustering geolocations in the history of time-stamped geolocations of the user; the history of time-stamped geolocations of the user comprise 20 or more geolocations having time-stamps spanning a duration of more than one hour; the model includes a two dimensional probability matrix with at least $N(N-1)$ of the probabilities of the user transitioning between each pair of the candidate user events, where N is a number of the candidate user events; the model includes at least $N(M-1)$ of the probabilities of obtaining the geolocation reported by the computing devices associated with the user, where M is a number of the plurality of geographic areas; inferring the reason why the user transitioned between the given sequential pair of the geographic areas comprises, inferring a sequence of two or more of the candidate user events that account for why the user transitioned between three consecutive geographic areas in the time series sequence of geographic areas by performing operations comprising: for a given one of inferred events: calculating most probable candidate sequences of the events that lead to a respective sequentially previous candidate event in the inferred sequence for each of the candidate events; and selecting the given one of the inferred events based on the calculated probabilities of the most probably candidate sequences for the previous candidate events, respective probabilities of transitioning to each candidate event for the given one of the inferred events, and respective probabilities of obtaining a geolocation in the history in the geographic area corresponding temporally to the given one of the inferred events.

3. The method of any of embodiments 1-2, wherein: the obtained geolocations are tiles in which the user was determined to be located.

4. The method of any of embodiments 1-3, wherein: the obtained geolocations are businesses in which the user was determined to be located.

5. The method of any of embodiments 1-4, wherein: the obtained geolocations are polygons in which the user was determined to be located.

6. The method of any of embodiments 1-5, wherein: obtaining the geographic areas comprises geographically clustering at least some geolocations in the history of time-stamped geolocations of the user.

7. The method of embodiment 6, wherein: geographically clustering at least some geolocations in the history comprises: determining that a subset of the at least some geolocations have at least a threshold number of other geolocations in the subset within a threshold geographic distance to define core geolocations.

8. The method of embodiment 7, comprising: determining that another subset of the at least some geolocations are within the threshold distance from a core geolocation to define reachable geolocations.

9. The method of embodiment 8, comprising: grouping subsets of the core geolocations by determining that respective core geolocations in respective subsets form a connected graph in which each core geolocation in the connected graph is within the threshold distance of another core geolocation in the connected graph; and for each subset, adding reachable geolocations within the threshold distance to a core geolocation in the respective subset to the respective subset to define a respective cluster, wherein at least some of the geographic areas correspond to a convex hull of a respective cluster.

10. The method of any of embodiments 1-9, comprising: obtaining survey results of users in which survey participants identify sequences of the candidate events and geolocations the survey participants visited following the candidate events; and constructing the model, at least in part, by calculating, based on the survey results: the probabilities of the user transitioning between each pair of the candidate user events; and the probabilities of obtaining a geolocation reported by the computing devices associated with the user in each of the plurality of geographic areas following each of the candidate user events.

11. The method of any of embodiments 1-10, comprising: obtaining an initial set of probabilities for the model; obtaining a training set of one or more sequences the geographic areas; calculating the probabilities of the model by repeatedly performing steps comprising: estimating the probabilities of the user transitioning between each pair of the candidate user events based on the training set and the initial set of probabilities or a revised set of probabilities if the revised set is available; normalizing the estimated probabilities of the user transitioning between each pair of the candidate user events to form revised probabilities of the user transitioning between each pair of the candidate user events; estimating the probabilities of obtaining a geolocation reported by the computing devices associated with the user based on the training set and the revised probabilities of the user transitioning between each pair of the candidate user events; normalizing the estimated probabilities of obtaining a geolocation reported by the computing devices associated with the user to form revised probabilities of obtaining a geolocation reported by the computing devices associated with the user, wherein the revised set of probabilities includes both the revised probabilities of the user transitioning between each pair of the candidate user events and the revised probabilities of obtaining a geolocation reported by the computing devices associated with the user.

12. The method of embodiment 11, comprising: determining that an amount of change between consecutive sets of revised probabilities is less than a threshold amount; and in response to determining that the amount of change between consecutive sets of revised probabilities is less than the threshold amount, ceasing to repeatedly perform the steps.

13. The method of any of embodiments 11-12, wherein estimating the probabilities of the user transitioning between each pair of the candidate user events based on the initial set of probabilities or a revised set of probabilities if available comprises: for each of the probabilities of the user transitioning between each pair of the candidate user events, performing steps comprising: for each of a plurality of pairs of sequential geographic areas in the training set, calculating a component probability of the user transitioning between the respective pair of candidate user events and a highest probability of the respective pair of sequential geographic areas based on the initial set of probabilities or the revised set of probabilities if the revised set of probabilities is available; dividing a sum of the component probabilities by a sum of the highest probabilities to form an estimated probability of the user transitioning between the respective pair of the candidate user events.

14. The method of any of embodiments 11-13, wherein estimating the probabilities of obtaining a geolocation reported by the computing devices associated with the user comprises: for each given geographic area in the training set, for each given candidate user event, and for each of a plurality of pairs of sequential geographic areas in the training set, calculating a component probability of the respective pair of sequential geographic areas assuming the respective given geographic area followed the respective given candidate user event and a highest probability of the respective pair of sequential geographic areas occurring in the set based on the initial set of probabilities or a revised set of probabilities if the revised set of probabilities is available; and dividing a sum of the component probabilities by a sum of the highest probabilities to form an estimated probability of obtaining a geolocation reported by the computing devices associated with the user in the respective given geographic area assuming the respective given candidate user event occurred.

15. The method of any of embodiments 1-14, wherein the model comprises: probabilities of the user transitioning to each candidate event following each two candidate events permutation of the candidate user events.

16. The method of any of embodiments 1-15, wherein the model comprises: a two dimensional probability matrix with at least $N(N-1)$ of the probabilities of the user transitioning between each pair of the candidate user events.

17. The method of any of embodiments 1-16, comprising: receiving, via a network, a request for content, the request including an identifier of the user; and selecting the content based on the inferred reason.

18. The method of any of embodiments 1-17, comprising: bidding in an auction for an opportunity to present an advertisement to the user based on the inferred reason.

19. The method of any of embodiments 1-18, comprising: inferring respective reasons why a plurality of users each transitioned between geographic areas, wherein the reasons for each respective users are inferred concurrently on different processors, wherein each of the processors is coupled to system memory storing parameters for different geographic areas.

20. The method of any of embodiments 1-19, wherein inferring the reason why the user transitioned between the given sequential pair of the geographic areas comprises, inferring a sequence of two or more of the candidate user events that account for why the user transitioned between three consecutive geographic areas in the time series sequence of geographic areas.

21. A tangible, machine-readable, non-transitory medium storing instructions that when executed by a data processing apparatus, cause the data processing apparatus to perform operations including the steps of any of embodiments 1-20.

22. A system, including: one or more processors; and memory storing instructions that when executed by the processors cause the processors to perform operations including the steps of any of embodiments 1-20.

What is claimed is:

1. A method of inferring a user's reason for movement between geolocations sensed by a mobile device of the user, the method comprising:
   obtaining, with one or more processors, a history of time-stamped geolocations of a user, the time-stamped geolocations being obtained based on data from one or more computing devices associated with the user and reported to one or more remote server systems;
   selecting, with one or more processors, a plurality of geographic areas based on each of the selected geographic areas including at least one of the time-stamped geolocations;
   associating, with one or more processors, the selected geographic areas with the time-stamp of the included geolocation to establish a time series sequence of the geographic areas;
   training, with one or more processors, a probabilistic model, wherein training the probabilistic model comprises:
      obtaining an initial set of probabilities for the model;
      selecting a training set of time series sequences of geographic areas for the user, wherein the training set comprises at least a portion of the established time series sequence of the geographic areas;
      selecting a plurality of user events, each user event being an underlying potential reason why users move between geographic locations;
      calculating a plurality of probabilities of the model by iterating steps comprising:
         estimating, for each pairwise combination of user events in the plurality of user events, a probability of the user transitioning between the pairwise combination of the user events based on the training set and, in a first iteration, the initial set of probabilities and, in a subsequent iteration, a revised set of probabilities;
         normalizing the estimated probabilities of the user transitioning between the pairwise combinations of user events to form revised probabilities of the user transitioning between the pairwise combinations of user events;
         estimating the probabilities of obtaining a geolocation reported by the computing devices associated with the user based on the training set and the revised probabilities of the user transitioning between the pairwise combinations of the user events; and
         normalizing the estimated probabilities of obtaining a geolocation reported by the computing devices associated with the user to form revised probabilities of obtaining a geolocation reported by the computing devices associated with the user,
         wherein the revised set of probabilities includes both the revised probabilities of the user transitioning between the pairwise combinations of the user events and the revised probabilities of obtaining a geolocation reported by the computing devices associated with the user;
   determining, with the trained probabilistic model, parameters for an input time series sequence of geographic areas based on a recent subset of time-stamped geolocations of the user in the history, the parameters comprising:
      a plurality of candidate user events from the plurality of user events, each candidate user event being an underlying potential reason why the user moved between geographic locations;
      probabilities of the user transitioning between each pair of the candidate user events; and
      probabilities of obtaining a geolocation reported by the computing devices associated with the user in each of the geographic areas in the input time series sequence of the geographic areas following occurrence of each of the candidate user events;
   inferring, with one or more processors, a reason why the user transitioned between a given sequential pair of the geographic areas in the input time series sequence of geographic areas responsive to the parameters determined by the trained probabilistic model, wherein the reason comprises one of the candidate user events; and storing, with one or more processors, the inferred reason in memory.

2. The method of claim 1, wherein:

the training set of time series sequences of geographic areas include at least three geographic areas;

the geographic areas are obtained by clustering geolocations in the history of time-stamped geolocations of the user;

the history of time-stamped geolocations of the user comprise 20 or more geolocations having time-stamps spanning a duration of more than one hour;

the trained probabilistic model includes a two dimensional probability matrix with at least $N(N-1)$ of the probabilities of the user transitioning between each pair of the candidate user events, where N is a number of the candidate user events within the plurality of user events;

the trained probabilistic model includes at least $N(M-1)$ of the probabilities of obtaining the geolocation reported by the computing devices associated with the user, where M is a number of geographic areas in the input time series sequence of geographic areas;

inferring the reason why the user transitioned between the given sequential pair of the geographic areas in the input time series sequence of geographic areas comprises, inferring a sequence of two or more of the candidate user events that account for why the user transitioned between three consecutive geographic areas in the input time series sequence of geographic areas by performing operations comprising:

for a given one of inferred events:

calculating most probable candidate sequences of the events that lead to a respective sequentially previous candidate event in the inferred sequence for each of the candidate events; and selecting the given one of the inferred events based on the calculated probabilities of the most probable candidate sequences for the previous candidate events, respective probabilities of transitioning to each candidate event for the given one of the inferred events, and respective probabilities of obtaining a geolocation in the recent subset of time-stamped geolocations of the user in the history in a geographic area in the input time series sequence of geographic areas corresponding temporally to the given one of the inferred events.

3. The method of claim 1, wherein:

the obtained geolocations are tiles in which the user was determined to be located.

4. The method of claim 1, wherein:

the obtained geolocations are businesses in which the user was determined to be located.

5. The method of claim 1, wherein:

the obtained geolocations are polygons in which the user was determined to be located.

6. The method of claim 1, wherein:

selecting a plurality of geographic areas based on each of the selected geographic areas including at least one of the time-stamped geolocations comprises geographically clustering at least some geolocations in the history of time-stamped geolocations of the user.

7. The method of claim 6, wherein:

geographically clustering at least some geolocations in the history comprises:

determining that a subset of the at least some geolocations have at least a threshold number of other geolocations in the subset within a threshold geographic distance to define core geolocations.

8. The method of claim 7, comprising:

determining that another subset of the at least some geolocations are within the threshold distance from a core geolocation to define reachable geolocations.

9. The method of claim 8, comprising:

grouping subsets of the core geolocations by determining that respective core geolocations in respective subsets form a connected graph in which each core geolocation in the connected graph is within the threshold distance of another core geolocation in the connected graph; and for each subset, adding reachable geolocations within the threshold distance to a core geolocation in the respective subset to the respective subset to define a respective cluster, wherein at least some of the selected geographic areas correspond to a convex hull of a respective cluster.

10. The method of claim 1, comprising:

obtaining survey results of users in which survey participants identify sequences of the candidate events and geolocations the survey participants visited following the candidate events; and wherein training the probabilistic model comprises calculating, based in part on the survey results:

the probabilities of the user transitioning between pairwise combinations of the user events based in part on the identified sequences of the candidate events; and the probabilities of obtaining a geolocation reported by the computing devices associated with the user based in part on the identified sequences of geolocations.

11. The method of claim 1, comprising:

determining that an amount of change between consecutive sets of revised probabilities is less than a threshold amount; and in response to determining that the amount of change between consecutive sets of revised probabilities is less than the threshold amount, ceasing to repeatedly perform the steps.

12. The method of claim 1, wherein estimating the probabilities of the user transitioning between the pairwise combinations of user events based on the initial set of probabilities or the revised set of probabilities comprises:

for each of the probabilities of the user transitioning between the pairwise combinations of user events, performing steps comprising:

for each of a plurality of pairs of sequential geographic areas in the training set, calculating a component probability of the user transitioning between the respective pair of user events and a highest probability of the respective pair of sequential geographic areas based on the initial set of probabilities or the revised set of probabilities if the revised set of probabilities is available; and dividing a sum of the component probabilities by a sum of the highest probabilities to form an estimated probability of the user transitioning between the respective pair of the user events.

13. The method of claim 1, wherein estimating the probabilities of obtaining a geolocation reported by the computing devices associated with the user comprises:

for each given geographic area in the training set, for each given user event, and for each of a plurality of pairs of sequential geographic areas in the training set, calculating a component probability of the respective pair of sequential geographic areas assuming the respective given geographic area followed the respective given user event and a highest probability of the respective pair of sequential geographic areas occurring in the set based on the initial set of probabilities or the revised set of probabilities if the revised set of probabilities is available; and dividing a sum of the component probabilities by a sum of the highest probabilities to form an estimated probability of obtaining a geolocation reported by the computing devices associated with the user in the respective given geographic area assuming the respective given user event occurred.

14. The method of claim 1, wherein the training the probabilistic model comprises:
   estimating probabilities of the user transitioning to each user event following each pairwise combination of user events, wherein
   the parameters determined with the trained probabilistic model comprise probabilities of the user transitioning to each candidate user event after each pair of the candidate user events.

15. The method of claim 1, wherein the trained probabilistic model comprises:
   a two dimensional probability matrix with at least N(N−1) of the probabilities of the user transitioning between each pair of the candidate user events.

16. The method of claim 1, comprising:
   receiving, via a network, a request for content, the request including an identifier of the user; and
   selecting the content based on the inferred reason.

17. The method of claim 1, comprising:
   bidding in an auction for an opportunity to present an advertisement to the user based on the inferred reason.

18. The method of claim 1, comprising:
   inferring respective reasons why a plurality of users each transitioned between geographic areas, wherein the reasons for each respective users are inferred concurrently on different processors, wherein each of the processors is coupled to system memory storing parameters for different geographic areas.

19. The method of claim 1, wherein inferring the reason why the user transitioned between the given sequential pair of the geographic areas comprises, inferring a sequence of two or more of the candidate user events that account for why the user transitioned between three consecutive geographic areas in the input time series sequence of geographic areas.

20. The method of claim 19, comprising for a given one of inferred events:
   calculating most probable candidate sequences of the events that lead to a respective sequentially previous candidate event in the inferred sequence for each of the candidate events; and
   selecting the given one of the inferred events based on the calculated probabilities of the most probable candidate sequences for the previous candidate events, respective probabilities of transitioning to each candidate event for the given one of the inferred events, and respective probabilities of obtaining a geolocation in the history in the geographic area corresponding temporally to the given one of the inferred events.

21. The method of claim 1, further comprising:
   concurrently training a plurality of probabilistic models for a plurality of different users with a plurality of different processors, each concurrently trained probabilistic model associated with respective ones of the plurality of users and operable to infer a reason why the respective user transitioned between a sequential pair of geographic areas;
   receiving a plurality of sets of time-stamped geolocations corresponding to responsive ones of at least some of the different users;
   determining, for each of the at least some of the different users, an input time series sequences of geographic areas from at least one corresponding set of time-stamped geolocations in the plurality of sets of time-stamped geolocations;
   selecting, for each of the at least some of the different users, the respective one of the trained probabilistic models;
   currently determining with a plurality of different processors, parameters for the input time series sequences of geographic areas corresponding to the at least some of the different users with the respective ones of the selected trained probabilistic models; and
   inferring respective reasons why the different users each transitioned between geographic areas based on the parameters for the input time series sequences of geographic areas corresponding to the at least some of the different users with the respective ones of the selected trained probabilistic models, wherein the reasons for each of the different users are inferred concurrently on different processors.

22. The method of claim 1, wherein:
   at least part of the method is executed concurrently for more than 100,000 users;
   associating the selected geographic areas with the time-stamp of the included geolocation to establish a time series sequence of the geographic areas comprises establishing augmented time series sequences by:
      precomputing one or more records including contextual information of at least some of the one or more computing devices associated with the user or the geographic areas;
      storing, before establishing the time series sequence, the precomputing records in a distributed cache of a computing cluster configured to execute a distributed analysis among a plurality of computing devices of the computing cluster; and
      establishing the time series sequence by refencing the precomputed records stored in the distributed cache.

23. The method of claim 1, further comprising:
   steps for passing contextual information needed for each tile or device implicated by a portion of an analysis.

24. The method of claim 1, wherein training the probabilistic model comprises:
   steps for expediting training.

25. A system, comprising:
   one or more processors; and
   memory storing instructions that when executed by at least some of the processors effectuate operations comprising:
      obtaining a history of time-stamped geolocations of a user, the time-stamped geolocations being obtained based on data from one or more computing devices associated with the user and reported to one or more remote server systems;
      selecting a plurality of geographic areas based on each of the selected geographic areas including at least one of the time-stamped geolocations;
      associating the selected geographic areas with the time-stamp of the included geolocation to establish a time series sequence of the geographic areas;

training a probabilistic model, wherein training the probabilistic model comprises:
  obtaining an initial set of probabilities for the model;
  selecting a training set of time series sequences of geographic areas for the user, wherein the training set comprises at least a portion of the established time series sequence of the geographic areas;
  selecting a plurality of user events, each user event being an underlying potential reason why users move between geographic locations;
  calculating a plurality of probabilities of the model by iterating steps comprising:
    estimating, for each pairwise combination of user events in the plurality of user events, a probability of the user transitioning between the pairwise combination of the user events based on the training set and, in a first iteration, the initial set of probabilities and, in a subsequent iteration, a revised set of probabilities;
    normalizing the estimated probabilities of the user transitioning between the pairwise combinations of user events to form revised probabilities of the user transitioning between the pairwise combinations of user events;
    estimating the probabilities of obtaining a geolocation reported by the computing devices associated with the user based on the training set and the revised probabilities of the user transitioning between the pairwise combinations of the user events; and
    normalizing the estimated probabilities of obtaining a geolocation reported by the computing devices associated with the user to form revised probabilities of obtaining a geolocation reported by the computing devices associated with the user, wherein the revised set of probabilities includes both the revised probabilities of the user transitioning between the pairwise combinations of the user events and the revised probabilities of obtaining a geolocation reported by the computing devices associated with the user;
determining, with the trained probabilistic model, parameters for an input time series sequence of geographic areas based on a recent subset of time-stamped geolocations of the user in the history, the parameters comprising:
  a plurality of candidate user events from the plurality of user events, each candidate user event being an underlying potential reason why the user moved between geographic locations;
  probabilities of the user transitioning between each pair of the candidate user events; and
  probabilities of obtaining a geolocation reported by the computing devices associated with the user in each of the geographic areas in the input time series sequence of the geographic areas following occurrence of each of the candidate user events;
inferring, with one or more processors, a reason why the user transitioned between a given sequential pair of the geographic areas in the input time series sequence of geographic areas responsive to the parameters determined by the trained probabilistic model, wherein the reason comprises one of the candidate user events; and
storing the inferred reason in memory.

* * * * *